(12) United States Patent
Hirai

(10) Patent No.: US 11,256,351 B2
(45) Date of Patent: Feb. 22, 2022

(54) DISPLAY SYSTEM

(71) Applicant: PANASONIC INTELLECTUAL PROPERTY MANAGEMENT CO., LTD., Osaka (JP)

(72) Inventor: Atsushi Hirai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/828,032

(22) Filed: Mar. 24, 2020

(65) Prior Publication Data

US 2020/0310578 A1 Oct. 1, 2020

(30) Foreign Application Priority Data

Mar. 27, 2019 (JP) .............................. JP2019-060317
Mar. 27, 2019 (JP) .............................. JP2019-060318
Jan. 10, 2020 (JP) .............................. JP2020-002920

(51) Int. Cl.
*G06F 3/041* (2006.01)
*G06F 3/044* (2006.01)

(52) U.S. Cl.
CPC .......... *G06F 3/0412* (2013.01); *G06F 3/0448* (2019.05)

(58) Field of Classification Search
CPC ................. G06F 3/0412; G06F 3/0448; G06F 3/041661; G06F 3/0443; G06F 3/044; G06F 3/0416; G02F 1/13338; G02F 1/134309
See application file for complete search history.

(56) References Cited

U.S. PATENT DOCUMENTS

| 10,379,669 | B2 | 8/2019 | Oh et al. |
| 2012/0062516 | A1* | 3/2012 | Chen .................. G06F 3/016 345/174 |
| 2013/0141348 | A1* | 6/2013 | Jamshidi-Roudbari ................... G06F 3/0412 345/173 |
| 2017/0108970 | A1* | 4/2017 | Kim ................. G09G 3/2092 |
| 2017/0315669 | A1 | 11/2017 | Oh et al. |
| 2019/0079576 | A1* | 3/2019 | Liu .................. G06F 3/04166 |
| 2021/0263363 | A1* | 8/2021 | Horie .................. H05B 33/04 |

FOREIGN PATENT DOCUMENTS

| JP | 2017-199341 | 11/2017 |
| WO | 2018/123813 | 7/2018 |

* cited by examiner

*Primary Examiner* — Sahlu Okebato
(74) *Attorney, Agent, or Firm* — Greenblum & Bernstein, P.L.C.

(57) ABSTRACT

In a display system, a display device includes multiple common electrodes used for both image display and touch detection. Within a frame period of the display device, a display period for which the display device displays an image and a touch detection period for which a touch detection circuit performs touch detection are alternately arranged. The display device includes a first touch detection region and multiple second touch detection regions, configured by dividing multiple common electrodes into multiple groups. During multiple touch detection periods, the touch detection circuit performs touch detection in the same first touch detection region and in a second touch detection region different for each touch detection period.

14 Claims, 17 Drawing Sheets

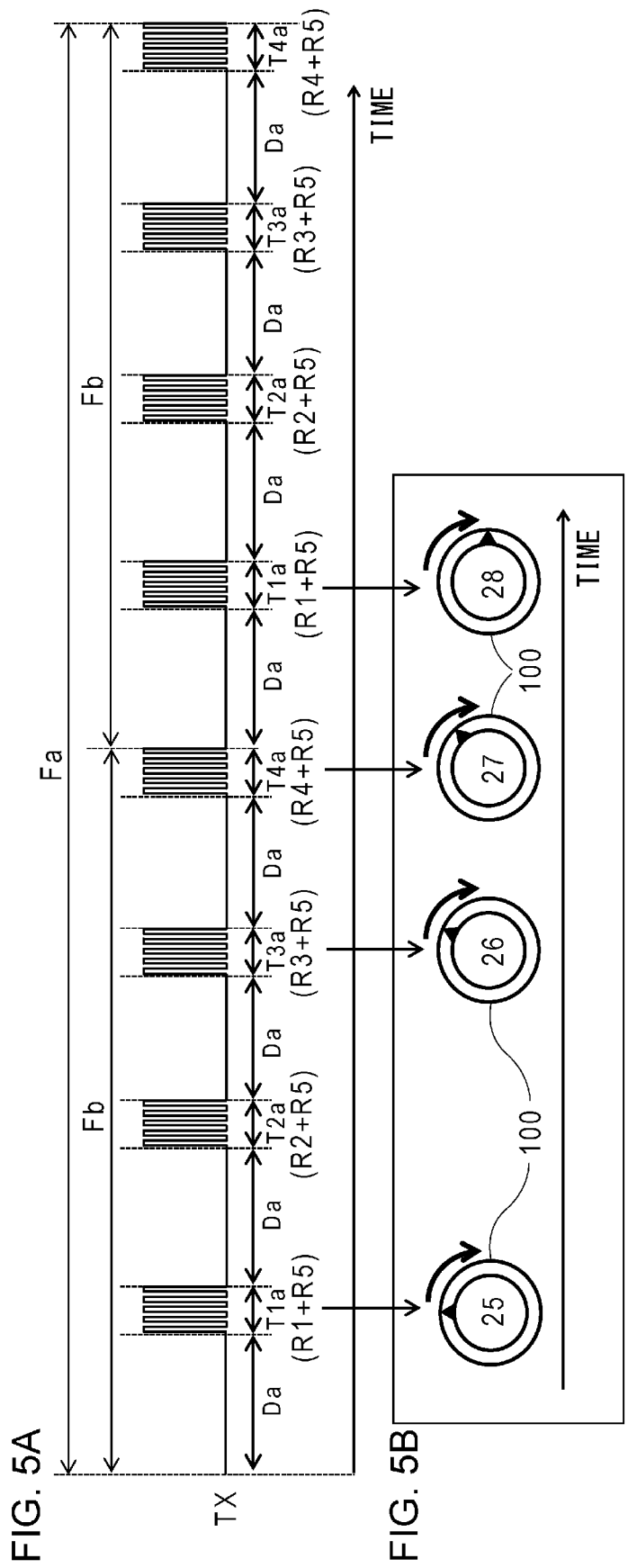

FIG. 6A  (FIRST COMPARATIVE EXAMPLE)
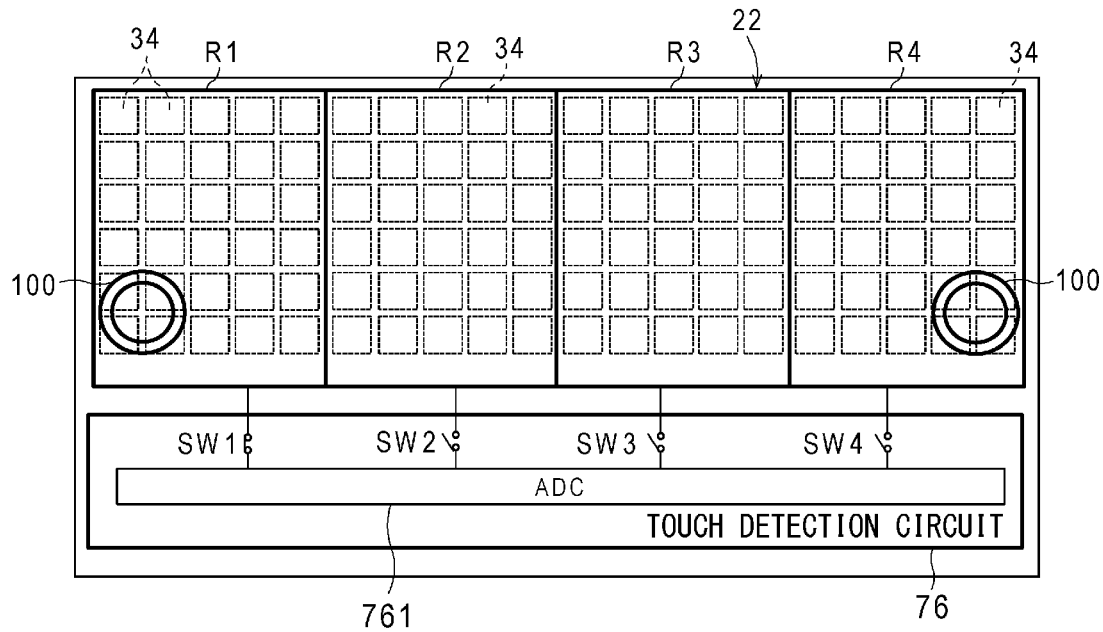
FIG. 6B
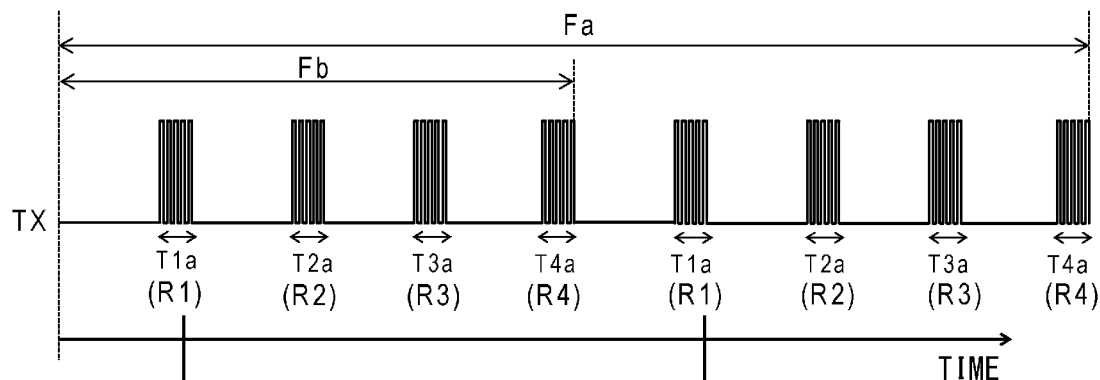
FIG. 6C
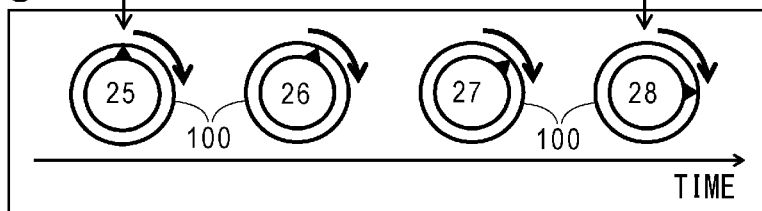

DISPLAY SYSTEM

BACKGROUND

1. Field

The present disclosure relates to a display system provided with a touch detection function, a control device, a control method, and a display device.

2. Description of the Related Art

An in-cell display device, in which a touch sensor for detecting a user's touch position is built into a display panel, is known (see Patent Document 1, for example). In such a display device, a common electrode used to supply a common voltage to each pixel of a liquid crystal display panel is divided into multiple common electrodes, which are also used as touch sensor electrodes. During an image display period, a common voltage is supplied to each of the multiple common electrodes, and, during a touch detection period, a touch drive signal for touch detection is supplied to each of the multiple common electrodes.

[Patent Document 1] WO 2018/123813

SUMMARY

For in-cell display devices, further improvement has been required.

To solve the problem above, a display system according to one aspect of the present disclosure includes a display device including multiple common electrodes used for both image display and touch detection, a drive circuit that supplies a touch drive signal to each of the multiple common electrodes, and a touch detection circuit that performs detection of a touch by an object on the display device, based on a touch detection signal received from each of the multiple common electrodes. Within a frame period of the display device, a display period for which the display device displays an image and a touch detection period for which a touch detection circuit performs touch detection are alternately arranged. The display device includes a first touch detection region and multiple second touch detection regions, configured by dividing multiple common electrodes into multiple groups. During multiple touch detection periods, the touch detection circuit performs touch detection in the same first touch detection region and in a second touch detection region different for each touch detection period.

Another aspect of the present disclosure is a control device. The device is a control device configured to control a display device including multiple common electrodes used for both image display and touch detection. The control device includes a drive circuit that supplies a touch drive signal to each of the multiple common electrodes, and a touch detection circuit that performs detection of a touch by an object on the display device, based on a touch detection signal received from each of the multiple common electrodes. Within a frame period of the display device, a display period for which the display device displays an image and a touch detection period for which a touch detection circuit performs touch detection are alternately arranged. The display device includes a first touch detection region and multiple second touch detection regions, configured by dividing multiple common electrodes into multiple groups. During multiple touch detection periods, the touch detection circuit performs touch detection in the same first touch detection region and in a second touch detection region different for each touch detection period.

Yet another aspect of the present disclosure is a control method. The method is a control method for a display device including multiple common electrodes used for both image display and touch detection. The control method includes supplying a touch drive signal to each of the multiple common electrodes, and performing detection of a touch by an object on the display device, based on a touch detection signal received from each of the multiple common electrodes. Within a frame period of the display device, a display period for which the display device displays an image and a touch detection period for which touch detection is performed are alternately arranged. The display device includes a first touch detection region and multiple second touch detection regions, configured by dividing multiple common electrodes into multiple groups. In the performing detection of a touch, during multiple touch detection periods, touch detection is performed in the same first touch detection region and in a second touch detection region different for each touch detection period.

A display system according to still yet another aspect of the present disclosure includes a display device comprising multiple common electrodes used for both image display and touch detection, a drive circuit that supplies a touch drive signal to each of the multiple common electrodes, and a touch detection circuit that performs detection of a touch by an object on the display device, based on a touch detection signal received from each of the multiple common electrodes. Within a frame period of the display device, a display period for which the display device displays an image and a touch detection period for which a touch detection circuit performs touch detection are alternately arranged. The display device includes multiple touch detection regions, configured by dividing the multiple common electrodes into multiple groups. When no touch has been detected, the touch detection circuit performs touch detection in a touch detection region different for each touch detection period, and, when a touch has been detected in one of the multiple touch detection regions, the touch detection circuit performs touch detection in the touch detection region where the touch has been detected, for multiple touch detection periods successively.

Still yet another aspect of the present disclosure is a control device. The device is a control device configured to control a display device including multiple common electrodes used for both image display and touch detection. The control device includes a drive circuit that supplies a touch drive signal to each of the multiple common electrodes, and a touch detection circuit that performs detection of a touch by an object on the display device, based on a touch detection signal received from each of the multiple common electrodes. Within a frame period of the display device, a display period for which the display device displays an image and a touch detection period for which a touch detection circuit performs touch detection are alternately arranged. The display device includes multiple touch detection regions, configured by dividing the multiple common electrodes into multiple groups. When no touch has been detected, the touch detection circuit performs touch detection in a touch detection region different for each touch detection period, and, when a touch has been detected in one of the multiple touch detection regions, the touch detection circuit performs touch detection in the touch detection region where the touch has been detected, for multiple touch detection periods successively.

A further aspect of the present disclosure is a control method. The method is a control method for a display device including multiple common electrodes used for both image display and touch detection. The control method includes supplying a touch drive signal to each of the multiple common electrodes, and performing detection of a touch by an object on the display device, based on a touch detection signal received from each of the multiple common electrodes. Within a frame period of the display device, a display period for which the display device displays an image and a touch detection period for which touch detection is performed are alternately arranged. The display device includes multiple touch detection regions, configured by dividing the multiple common electrodes into multiple groups. In the performing detection of a touch, when no touch has been detected, touch detection is performed in a touch detection region different for each touch detection period, and, when a touch has been detected in one of the multiple touch detection regions, touch detection is performed in the touch detection region where the touch has been detected, for multiple touch detection periods successively.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5A shows times and waveforms of a touch drive signal within a frame period of the display device shown in FIG. 1, and FIG. 5B shows a rotating position of a dial at each time shown in FIG. 5A;

FIG. 6A is a diagram used to describe operations of a display device in a first comparative example, FIG. 6B shows times within a frame period in the first comparative example, and FIG. 6C shows a rotating position of a dial at each time shown in FIG. 6B;

DETAILED DESCRIPTION

Figure 1:
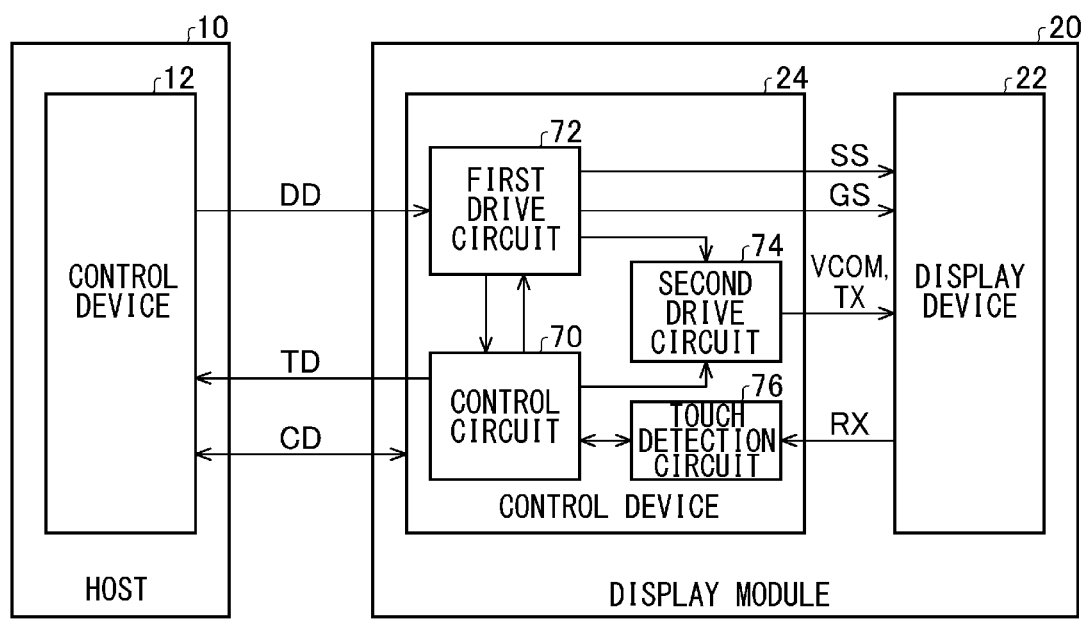
FIG. 1 is a block diagram of a display system according to a first embodiment.

The invention will now be described by reference to the preferred embodiments. This does not intend to limit the scope of the present invention, but to exemplify the invention.

Base Findings of Present Disclosure

Before specific description of embodiments are given, the base findings will be described. In an in-cell touch display, one frame period is temporally divided into multiple image display periods and multiple touch detection periods. Also, a screen is divided into multiple touch detection regions (also called scan blocks), and touch detection is performed in a touch detection region different for each touch detection period, so that touch detection for one screen is performed in one frame period. When the touch detection for one screen is repeated multiple times within one frame period, a time interval between successive touch detections at one position within the screen can be shortened.

In such a configuration, if the resolution of the display is increased, the time assignable to a touch detection period will be limited in a frame period of a certain length. Accordingly, the inventor has found a problem that increasing the number of times the touch detection for one screen is repeated within one frame period will be difficult, and shortening a time interval between successive touch detections at one position within the screen, i.e., speeding up response to a touch detection, will be difficult. In order to solve the problem, a display system according to the present disclosure is configured as described below.

Like reference characters denote like or corresponding constituting elements, members, and processes in each drawing, and repetitive description will be omitted as appropriate. Also, the dimensions of a member may be appropriately enlarged or reduced in each drawing in order to facilitate understanding.

First Embodiment

FIG. 1 is a block diagram of a display system 1 according to the first embodiment. Although an example will be described in which the display system 1 is a vehicle-mounted display system 1 mounted on a vehicle, such as an automobile, the application is not particularly limited, and the display system 1 may also be used for a mobile device.

The display system 1 includes a host 10 and a display module 20. The host 10 performs various functions, such as radio, car navigation, and Bluetooth (registered trademark) communication, and controls the display module 20. The host 10 includes a control device 12.

The control device 12 may be a CPU, for example, and also called a host CPU. The control device 12 supplies image data DD and control data CD to the display module 20 and controls the display module 20 based on such data.

The display module 20 includes a display device 22 and a control device 24. The display device 22 may be used as a center display, on which a car navigation screen or the like is displayed, within a vehicle cabin, for example.

The display device 22 is an in-cell liquid crystal display device of an in plane switching (IPS) type and configured as a touch display on which a touch position can be detected. The configuration of the display device 22 may be a well-known configuration as described below, for example.

Figure 2:
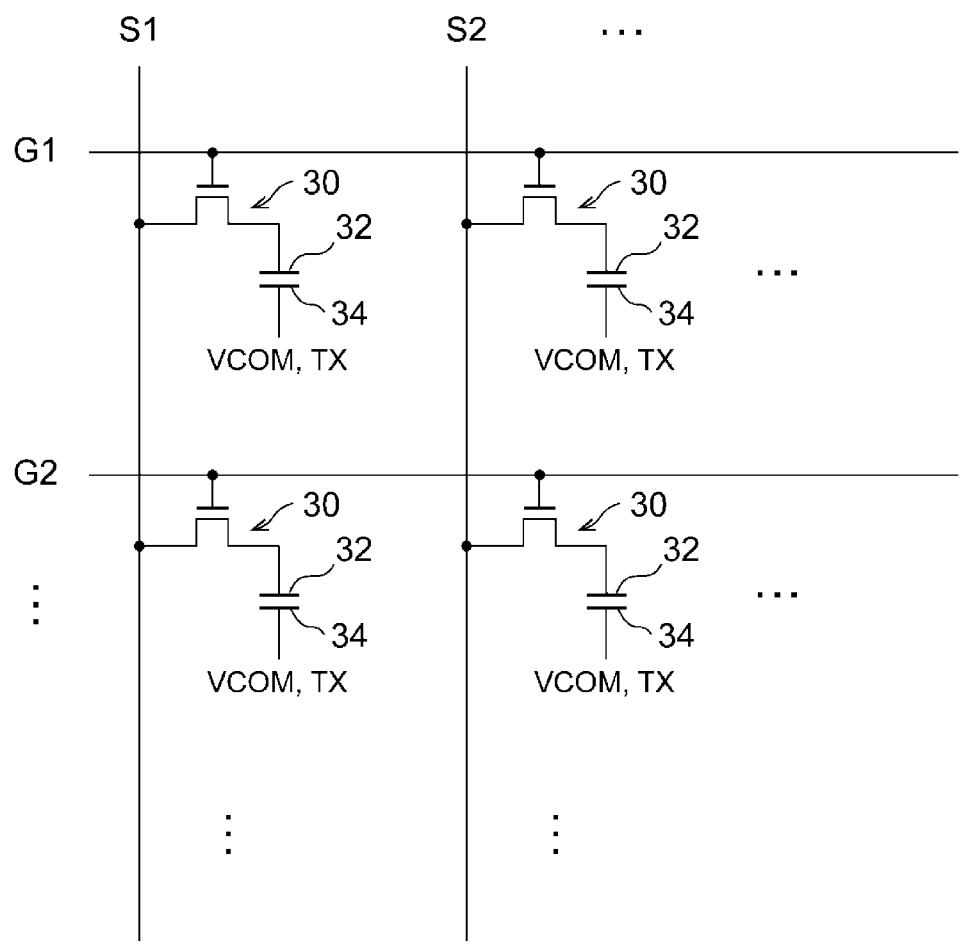
FIG. 2 is a diagram that schematically shows a circuit configuration of a display device shown in FIG. 1.

FIG. 2 schematically shows a circuit configuration of the display device 22 shown in FIG. 1. FIG. 2 also shows a schematic arrangement of constituting elements. The display device 22 includes multiple gate lines G1, G2, and so on extending in a row direction, multiple source lines S1, S2, and so on extending in a column direction, multiple pixel switching elements 30, multiple pixel electrodes 32, and multiple common electrodes 34. Each pixel switching element 30 is a thin-film transistor provided near an intersection of a gate line and a source line such as to correspond to a pixel. In each pixel switching element 30, the gate is connected with a gate line, the source is connected with a source line, and the drain is connected with a pixel electrode 32. For one common electrode 34, multiple pixel switching elements 30 and multiple pixel electrodes 32 are arranged. The liquid crystal layer is controlled by means of electric fields between pixel electrodes 32 and common electrodes 34. The common electrodes 34 are used for both image display and touch detection. Accordingly, the number of electrode layers can be reduced, so that the display device 22 can be made thinner. The common electrodes 34 may also be referred to as sensor electrodes.

Figure 3:
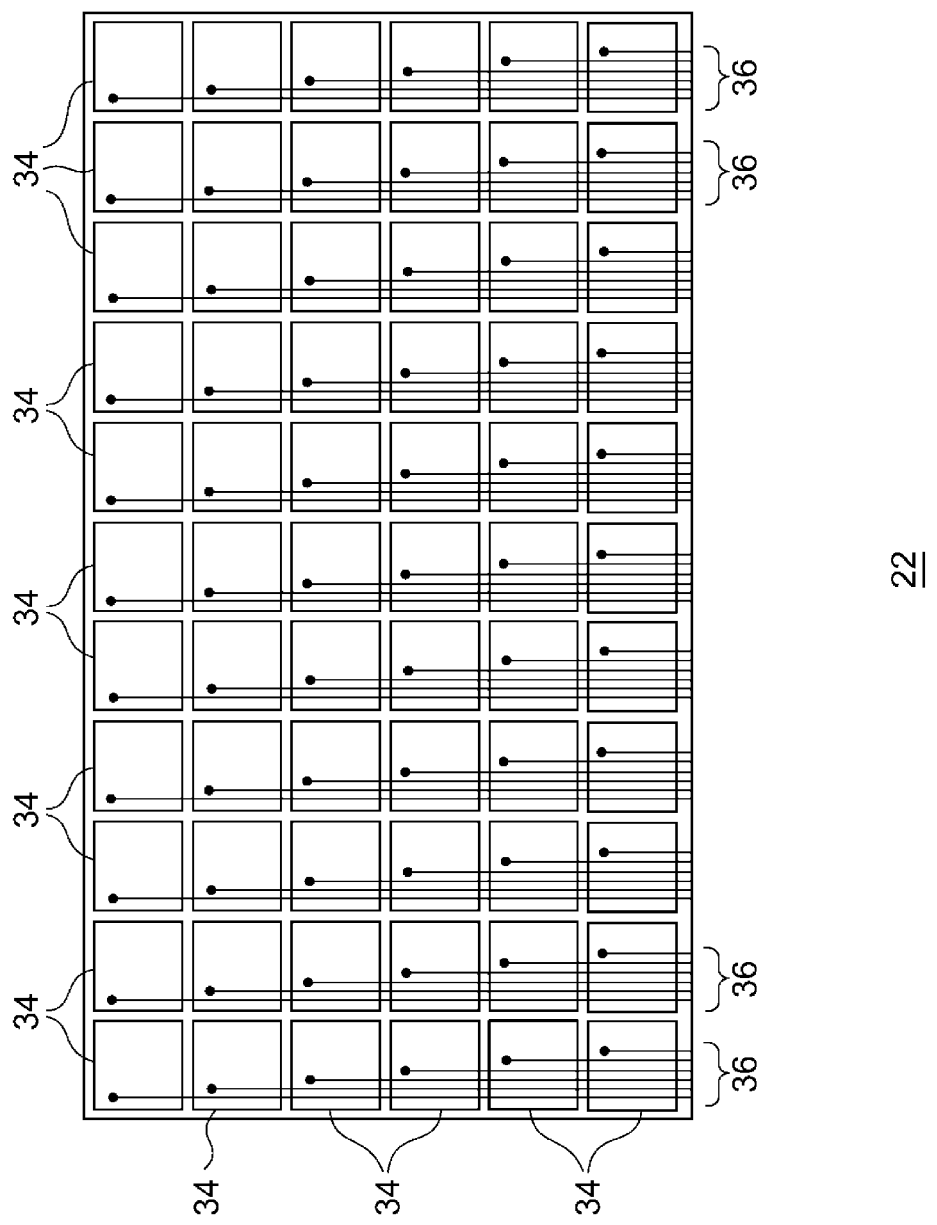
FIG. 3 is a top view that shows an arrangement of common electrodes shown in FIG. 2.

FIG. 3 is a top view that shows an arrangement of the common electrodes 34 shown in FIG. 2. The multiple common electrodes 34 are arranged in a matrix. Each common electrode 34 is connected to the control device 24 with a signal line 36.

The display device 22 detects a touch position based on the self-capacitance method. When a finger is brought closer to the display surface of the display device 22, capacitance is formed between a common electrode 34 and the finger. The formation of capacitance increases parasitic capacitance in the common electrode 34, so that the current flowing when a touch drive signal is supplied to the common electrode 34 is increased. Based on the current variation, the touch position is detected.

The description now returns to FIG. 1. The control device 24 may be configured as an IC, for example, and controls the display device 22 based on the control data CD and the image data DD from the host 10. The control device 24 includes a control circuit 70, a first drive circuit 72, a second drive circuit 74, and a touch detection circuit 76.

The control circuit 70 may be configured as a microcomputer, for example, and controls signal generation timing of the first drive circuit 72 and the second drive circuit 74, touch detection timing of the touch detection circuit 76, and the like.

The control circuit 70 controls the first drive circuit 72, the second drive circuit 74, and the touch detection circuit 76 such that, during a frame period (one frame period), one frame of a display image is rendered on the display device 22 and touch detection for one screen is performed at least once. The frame period may also be referred to as a vertical synchronization period. The frame period will be detailed later.

The first drive circuit 72 generates a reference clock signal under the control of the control circuit 70. The first drive circuit 72 also generates, under the control of the control circuit 70, a source signal SS in synchronization with the generated reference clock signal, based on the image data DD from the host 10. The first drive circuit 72 also generates, under the control of the control circuit 70, a gate signal GS in synchronization with the generated reference clock signal.

The first drive circuit 72 supplies the source signal SS serially to multiple source lines in the display device 22, and also supplies the gate signal GS serially to multiple gate lines in the display device 22.

The first drive circuit 72 supplies the reference clock signal to the second drive circuit 74. The second drive circuit 74 generates a reference voltage VCOM, which is a predetermined fixed voltage, and a touch drive signal TX in synchronization with the reference clock signal, under the control of the control circuit 70. The touch drive signal TX may be a square wave signal, or may be a sine wave signal. Through the signal lines 36 shown in FIG. 3, the second drive circuit 74 supplies the reference voltage VCOM or the touch drive signal TX to the multiple common electrodes 34 in the entire display device 22.

The touch detection circuit 76 detects a touch by an object on the display device 22. Under the control of the control circuit 70, the touch detection circuit 76 performs detection of a touch by an object on a position corresponding to a common electrode 34, based on a touch detection signal Rx received from the common electrode 34 when the touch drive signal TX is supplied to each common electrode 34.

The touch detection circuit 76 integrates the touch detection signal Rx received from each common electrode 34 and derives, as a detection value, a difference between the integral value and a reference value, for each pulse timing of the touch drive signal TX. For the touch detection signal Rx received from one common electrode 34 during one touch detection period, the number of obtained detection values is identical with the number of pulses in the touch drive signal TX within one touch detection period. Each detection value represents a difference value between the capacitance of the common electrode 34 and a reference capacitance. When the capacitance variation in a common electrode 34 due to a touch by an object is larger, the detection value becomes larger. When there is no touch and the capacitance variation in a common electrode 34 is zero, the detection value is also zero. For each of the touch detection signals Rx received from the common electrodes 34, the touch detection circuit 76 derives the sum of multiple detection values within one touch detection period.

The touch detection circuit 76 compares the sum of the detection values derived based on the touch detection signal Rx received from each common electrode 34 with a predetermined touch detection threshold. When the sum of the detection values is greater than or equal to the touch detection threshold, the touch detection circuit 76 judges that there has been a touch to the position of the corresponding common electrode 34. This corresponds to that a touch is detected. Based on the position of the common electrode 34 to which it is judged that there has been a touch, the touch detection circuit 76 detects a touch position within the screen. The touch detection circuit 76 outputs touch position information of the touch position thus detected to the control circuit 70.

Based on the touch position information from the touch detection circuit 76, the control circuit 70 derives coordinate data TD of the touch position and outputs the coordinate data TD to the control device 12 in the host 10. The control device 12 performs various processes based on the coordinate data TD.

The configurations of the control device 12 and the control circuit 70 can be implemented by cooperation between hardware resources and software resources or only by hardware resources. As the hardware resources, analog devices, microcomputers, DSPs, ROMs, RAMs, FPGAs, or other LSIs can be employed. As the software resources, programs, such as firmware, can be employed.

In the following, the control of the display device 22 performed by the control circuit 70 and the operations of the display device 22 will be specifically described. The control circuit 70 alternately repeats partial image display on one of multiple display regions within the screen and partial touch detection on part of multiple touch detection regions within the screen, so as to control the image display and the touch detection in a time division manner.

Figure 4:
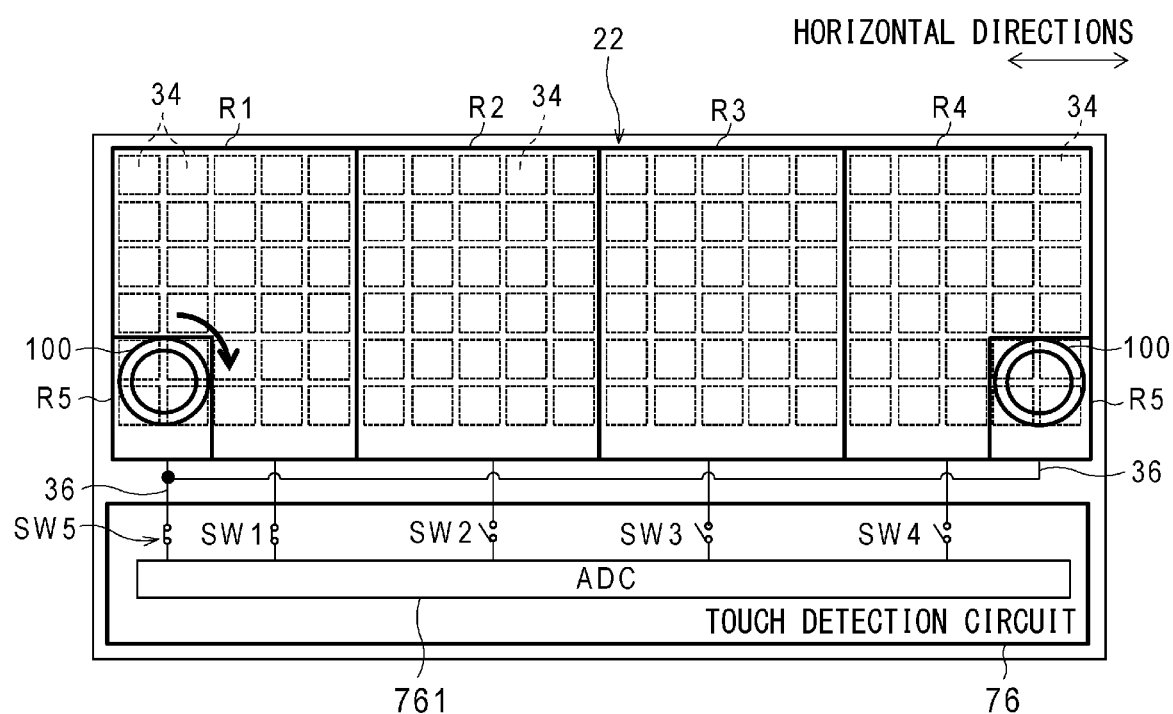
FIG. 4 is a diagram used to describe operations of the display device shown in FIG. 1.

FIG. 4 is a diagram used to describe operations of the display device 22 shown in FIG. 1. The display device 22 includes two first touch detection regions R5 and R5, and four second touch detection regions R1, R2, R3, and R4, which are configured by dividing the multiple common electrodes 34 within the screen into multiple groups.

One first touch detection region R5 is positioned at the bottom-left corner of the screen, and the other first touch detection region R5 is positioned at the bottom-right corner of the screen. The second touch detection regions R1, R2, R3, and R4 are horizontally arranged from the left to the right in this order when viewed from the viewer. Among the multiple common electrodes 34 of the entire display device 22, multiple common electrodes 34 are arranged in each of the first touch detection regions R5 and R5 and the second touch detection regions R1 through R4. The number of common electrodes 34 arranged in each touch detection region shown in FIG. 4 is set as an example. In the display device 22, the number of first touch detection regions is not limited to "two", and the number of second touch detection regions is not limited to "four".

The display system 1 includes dials 100 that are rotatable and disposed respectively in the first touch detection regions R5 and R5 on the display surface of the display device 22. The dials 100 may be used for temperature setting of an air conditioner in a vehicle, for example.

Each dial 100 is rotatable about a rotating shaft fixed on the display surface of the display device 22, in response to a user's operation. On a part of each dial 100 that faces the display surface of the display device 22, an electric conductor, not illustrated, is disposed. With the rotation of the dial 100, the electric conductor also rotates about the rotating shaft. The touch detection circuit 76 detects a rotating position of a dial 100, which is also a position of an electric conductor, as a touch position.

The touch detection circuit 76 includes an A/D converter 761, and switches SW1, SW2, SW3, SW4, and SW5. Each switch includes multiple pairs of an input terminal and an output terminal, though the illustration thereof is omitted. For simplified drawing, the connections between the common electrodes 34 and the signal lines 36 are omitted in FIG. 4.

The multiple input terminals of the switch SW1 are respectively connected to the multiple common electrodes 34 included in the second touch detection region R1 on a one-to-one basis, with the signal lines 36. The multiple input terminals of the switch SW2 are respectively connected to the multiple common electrodes 34 included in the second touch detection region R2 on a one-to-one basis, with the signal lines 36. The multiple input terminals of the switch SW3 are respectively connected to the multiple common electrodes 34 included in the second touch detection region R3 on a one-to-one basis, with the signal lines 36. The multiple input terminals of the switch SW4 are respectively connected to the multiple common electrodes 34 included in the second touch detection region R4 on a one-to-one basis, with the signal lines 36. The multiple input terminals of the switch SW5 are respectively connected to the multiple common electrodes 34 included in the first touch detection regions R5 on a one-to-one basis, with the signal lines 36.

The output terminals of the switches SW1 through SW5 are connected to input ports of the A/D converter 761. Since the number of input ports of the A/D converter 761 is less than the number of common electrodes 34 within the screen, the common electrodes 34 connected to the input ports of the A/D converter 761 are switched by means of the switches. The number of input ports of the A/D converter 761 is equal to the number of input signals that can be simultaneously processed at the A/D converter 761, and may also be referred to as the number of input channels.

FIG. 5A shows times and waveforms of the touch drive signal TX within a frame period Fa of the display device 22 shown in FIG. 1, and FIG. 5B shows a rotating position of a dial 100 at each time shown in FIG. 5A.

In the example shown in FIG. 5A, within a frame period (one frame period) Fa, one image is displayed and touch detection for one screen is performed twice. In the present embodiment, the display device 22 is assumed to be a display device driven at 60 Hz to display an image, so that the frame period Fa is set to about 16.7 ($=1/60$) ms. Since the touch detection for one screen is performed twice within a frame period Fa, the touch detection is performed with a period of about 8.3 ($=1/120$) ms.

A frame period Fa is divided into two sub-frame periods Fb. Each sub-frame period Fb includes four display periods Da and four touch detection periods T1a, T2a, T3a, and T4a. The display periods Da and the touch detection periods are alternately arranged. In each sub-frame period Fb, the display period Da, touch detection period T1a, display period Da, touch detection period T2a, display period Da, touch detection period T3a, display period Da, and touch detection period T4a are arranged in this order. The number of display periods Da and the number of touch detection periods in a frame period Fa are not limited to "eight".

The display device 22 displays one-eighth of a frame for each display period Da. Accordingly, one frame is displayed in the eight display periods Da within a frame period Fa. More specifically, during a display period Da, the first drive circuit 72 supplies the source signal SS to the multiple source lines and also supplies the gate signal GS to corresponding gate lines, and the second drive circuit 74 supplies the reference voltage VCOM to the multiple common electrodes 34. The second drive circuit 74 stops supply of the touch drive signal TX during the display periods Da.

During each touch detection period, the second drive circuit 74 supplies the touch drive signal TX to the multiple common electrodes 34 in the first touch detection regions R5 and the second touch detection regions R1 through R4. The second drive circuit 74 stops supply of the reference voltage VCOM during the touch detection periods.

While making the switch SW5 conductive, the control circuit 70 also makes a different one of the switches SW1, SW2, SW3, and SW4 conductive for each touch detection period. The touch detection signals Rx input to the switches thus made conductive are output to the A/D converter 761. The A/D converter 761 converts the analog touch detection signals Rx input via the switches, into digital touch detection signals.

During the touch detection period T1a, the touch detection circuit 76 performs detection of a touch by an object on the first touch detection regions R5 and the second touch detection region R1, based on the touch detection signals Rx received from the multiple common electrodes 34 in the first touch detection regions R5 and the second touch detection region R1.

During the touch detection period T2a, the touch detection circuit 76 performs detection of a touch by an object on the first touch detection regions R5 and the second touch detection region R2, based on the touch detection signals Rx received from the multiple common electrodes 34 in the first touch detection regions R5 and the second touch detection region R2.

During the touch detection period T3a, the touch detection circuit 76 performs detection of a touch by an object on the first touch detection regions R5 and the second touch detection region R3, based on the touch detection signals Rx received from the multiple common electrodes 34 in the first touch detection regions R5 and the second touch detection region R3.

During the touch detection period T4a, the touch detection circuit 76 performs detection of a touch by an object on the first touch detection regions R5 and the second touch detection region R4, based on the touch detection signals Rx received from the multiple common electrodes 34 in the first touch detection regions R5 and the second touch detection region R4.

Thus, during each of the multiple touch detection periods, the touch detection circuit 76 performs touch detection in the same first touch detection regions R5 and a second touch detection region different for each touch detection period. In other words, the touch detection circuit 76 fixes the first touch detection regions R5 as detection targets and serially changes the second touch detection region as a detection target. During the eight touch detection periods in a frame period Fa, touch detection for one screen is performed twice. The display device 22 may include touch detection regions equal in number to the touch detection periods in a frame period Fa, and, in this case, the touch detection for one screen is performed once during the multiple touch detection periods in a frame period Fa.

A first comparative example will now be described. FIG. 6A is a diagram used to describe operations of the display device 22 in the first comparative example, FIG. 6B shows times within a frame period Fa in the first comparative example, and FIG. 6C shows a rotating position of a dial 100 at each time shown in FIG. 6B.

The first comparative example differs from the present embodiment in that the first touch detection regions R5 are not provided, and the multiple common electrodes 34 in the entire display device 22 are grouped into the second touch detection regions R1 through R4. Accordingly, the common electrodes 34 that overlap with the dial 100 on the left side are included in the second touch detection region R1, and the common electrodes 34 that overlap with the dial 100 on the right side are included in the second touch detection region R4.

During each of the multiple touch detection periods, touch detection is performed in a second touch detection region different for each touch detection period. The touch detection for the dial 100 on the left side is performed in the touch detection period T1a, every 8.3 ms as a sub-frame period Fb. The touch detection for the dial 100 on the right side is also performed similarly. As shown in FIG. 6C, when the rotating position "25" of the dial 100 on the left side is detected in the touch detection period T1a and the rotating position is then moved to "28" within 8.3 ms thereafter, for example, the rotating position "28" is detected in the next touch detection period T1a, while the rotating positions "26" and "27" are not detected. Accordingly, when the rotating operation of a dial 100 is performed at relatively high speed, successive multiple rotating positions may not be sometimes detected.

In contrast with the first comparative example, in the present embodiment, the touch detection in the first touch detection regions R5 is performed in each of the multiple touch detection periods, as described previously. Therefore, response to a touch detection in the first touch detection regions R5, in which the dials 100 are disposed, can be made faster than that in the first comparative example. In this example, the touch detection in the first touch detection regions R5 is performed with a period of about 2.1 ms. Accordingly, when the rotating position of a dial 100 moves from "25" to "28" within a sub-frame period, as shown in FIG. 5B, each of the rotating positions "25", "26", "27", and "28" is detected. Therefore, successive multiple rotating positions can be detected more certainly, compared to the first comparative example.

Figure 7:
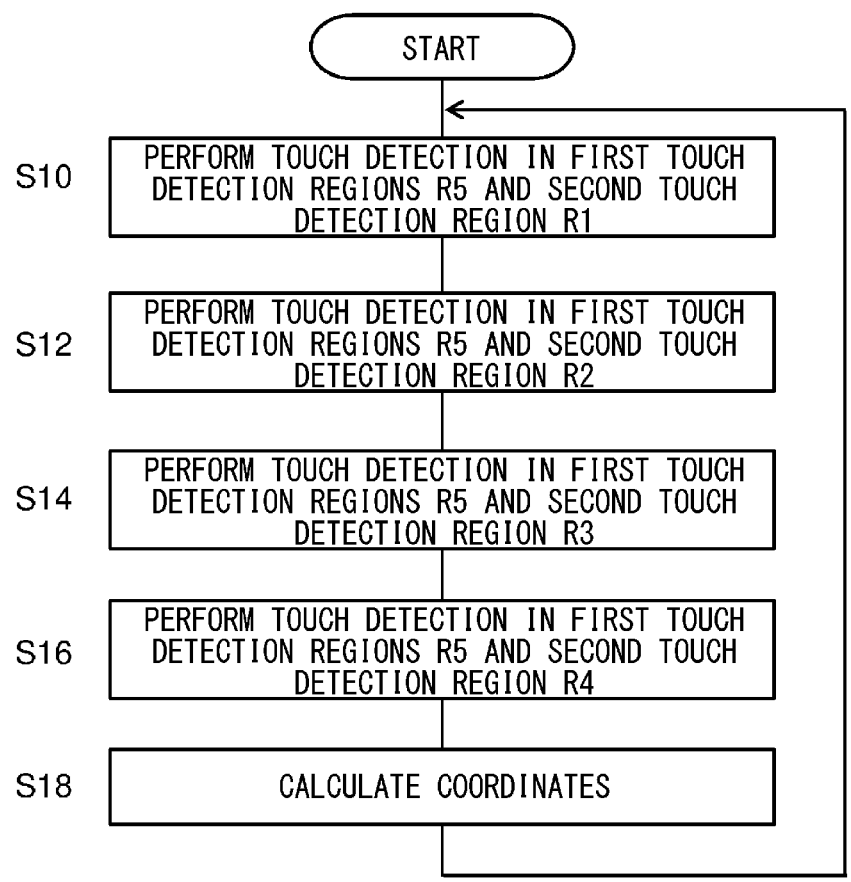
FIG. 7 is a flowchart that shows touch detection processing performed in the display system shown in FIG. 1.

There will now be described the overall operation of the display system 1 having the configuration set forth above. FIG. 7 is a flowchart that shows touch detection processing performed in the display system 1 shown in FIG. 1. The touch detection circuit 76 performs touch detection in the first touch detection regions R5 and the second touch detection region R1 (S10), performs touch detection in the first touch detection regions R5 and the second touch detection region R2 (S12), performs touch detection in the first touch detection regions R5 and the second touch detection region R3 (S14), and performs touch detection in the first touch detection regions R5 and the second touch detection region R4 (S16). The control circuit 70 calculates the coordinates (S18), and the process returns to S10. The control circuit 70 may calculate the coordinates in each of the steps S10 through S16.

The present embodiment can make the response to a touch detection in the first touch detection regions R5 faster than that in the second touch detection regions. This enables faster response to a detection of a rotating position of a dial 100.

FIG. 4 shows an example in which the number of common electrodes 34 in the second touch detection region R1 is less by the number of common electrodes 34 in a first touch detection region R5 than the number of common electrodes 34 in the second touch detection region R2. However, the number of common electrodes 34 in each of the second touch detection regions R1 through R4 may be identical or nearly identical. In this case, the number of common electrodes 34 in the first touch detection regions R5 and the second touch detection region R2 simultaneously connected to the A/D converter 761 and the number of common electrodes 34 in the first touch detection regions R5 and the second touch detection region R3 simultaneously connected to the A/D converter 761 can be both reduced, compared to those in the embodiment. Therefore, the case where the number of input ports of the A/D converter 761 is smaller can also be handled.

Second Embodiment

The second embodiment differs from the first embodiment in that a first touch detection region is set at a position where a touch has been detected. In the following, description will be given mainly for the differences from the first embodiment.

The control circuit 70 sets different touch detection regions before and after a touch is detected, by switching the division pattern of the multiple common electrodes 34.

When no touch has been detected, the control circuit 70 sets second touch detection regions R1 through R4, in which the multiple common electrodes 34 within the screen are equally divided into four groups. When no touch has been detected, during each of the multiple touch detection periods T1a through T4a, the touch detection circuit 76 performs touch detection in a second touch detection region different for each touch detection period.

Figure 8A:
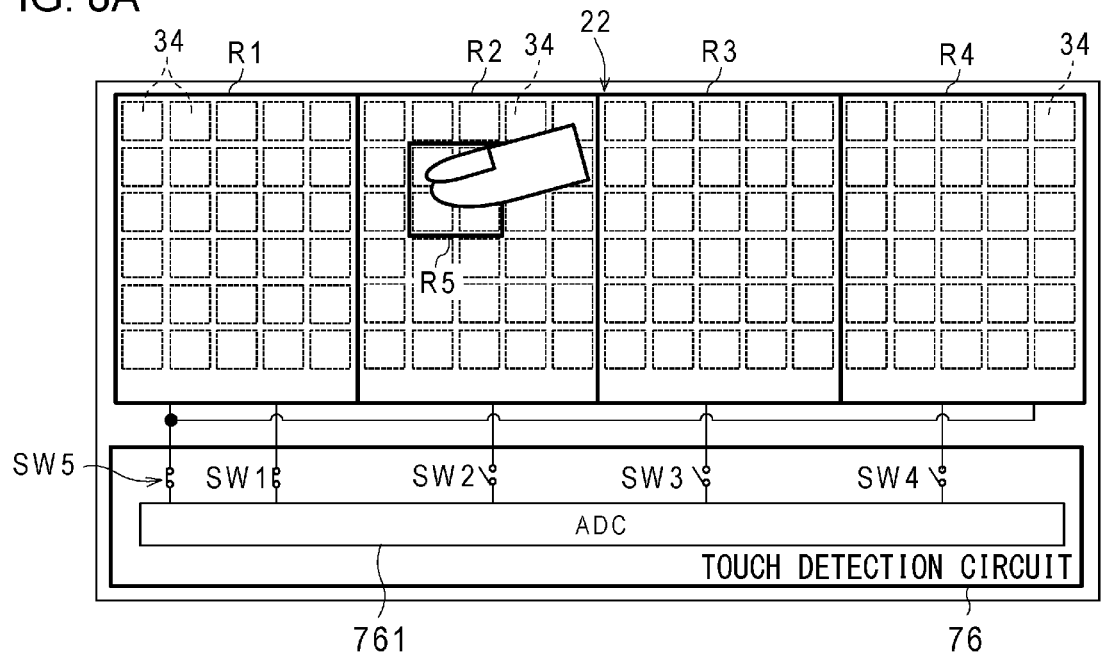
FIG. 8A is a diagram used to describe operations of a display device according to a second embodiment.
Figure 8B:
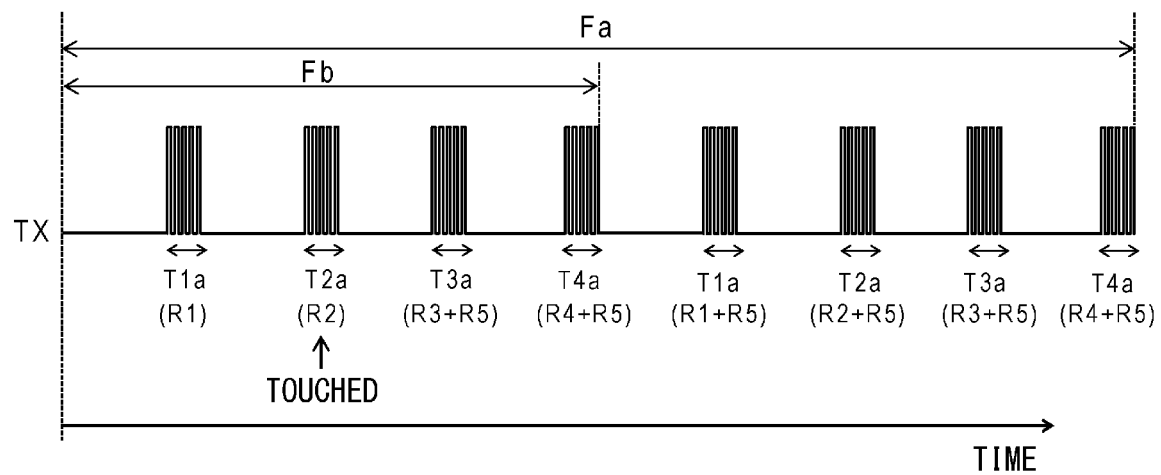
FIG. 8B shows times within a frame period of the display device shown in FIG. 8A.

FIG. 8A is a diagram used to describe operations of the display device 22 according to the second embodiment, and FIG. 8B shows times within a frame period Fa of the display device 22 shown in FIG. 8A. FIGS. 8A and 8B show an example in which a touch is detected within the second touch detection region R2 in the touch detection period T2a.

When a touch is detected, the control circuit 70 sets a first touch detection region R5 that includes a common electrode 34 at the position of the touch thus detected. The control circuit 70 may set the first touch detection region R5 that also includes a predetermined number of common electrodes 34 around the common electrode 34 at the position of the touch thus detected. The predetermined number may be appropriately determined through experiments and simulations such that a slide of the touched object can be detected, based on the size of the common electrodes 34 or the like. In the illustrated example, the first touch detection region R5 is set to include four common electrodes 34 within the second touch detection region R2. The control circuit 70 excludes, from the second touch detection region R2, the common electrodes 34 in the first touch detection region R5 thus set.

When a touch has been detected, during each of the multiple touch detection periods, the touch detection circuit 76 performs touch detection in the same first touch detection region R5 and a second touch detection region different for each touch detection period. In the illustrated example, the touch detection circuit 76 performs touch detection in the first touch detection region R5 and the second touch detection region R3 during the touch detection period T3a subsequent to the touch detection period T2a in which a touch has been detected, and performs touch detection in the first touch detection region R5 and the second touch detection region R4 during the subsequent touch detection period T4a. Thereafter, the touch detection circuit 76 performs touch detection in the first touch detection region R5 and the second touch detection region R1 during the subsequent touch detection period T1a, and performs touch detection in the first touch detection region R5 and the second touch detection region R2 during the subsequent touch detection period T2a.

Accordingly, the touch detection in the first touch detection region R5 is performed with a shorter period, compared to the touch detection in the second touch detection region R1 or the like. Therefore, the occasion where the finger touching the screen is removed or slid can be detected at earlier timing, compared to the aforementioned first comparative example.

When the control circuit 70 has set the first touch detection region R5 that includes a common electrode 34 at the position where a touch has been detected and when a touch can no longer be detected in the first touch detection region R5, the control circuit 70 cancels the setting of the first touch detection region R5, includes the common electrodes 34 of the first touch detection region R5 in the original second touch detection region, and performs touch detection in a second touch detection region different for each touch detection period. In other words, when a touch can no longer be detected in the first touch detection region R5, the control circuit 70 performs the same control as when no touch has been detected. Accordingly, when a touch can no longer be detected, the number of touch detection signals Rx processed at the touch detection circuit 76 during one touch detection period can be reduced thereafter.

Figure 9:
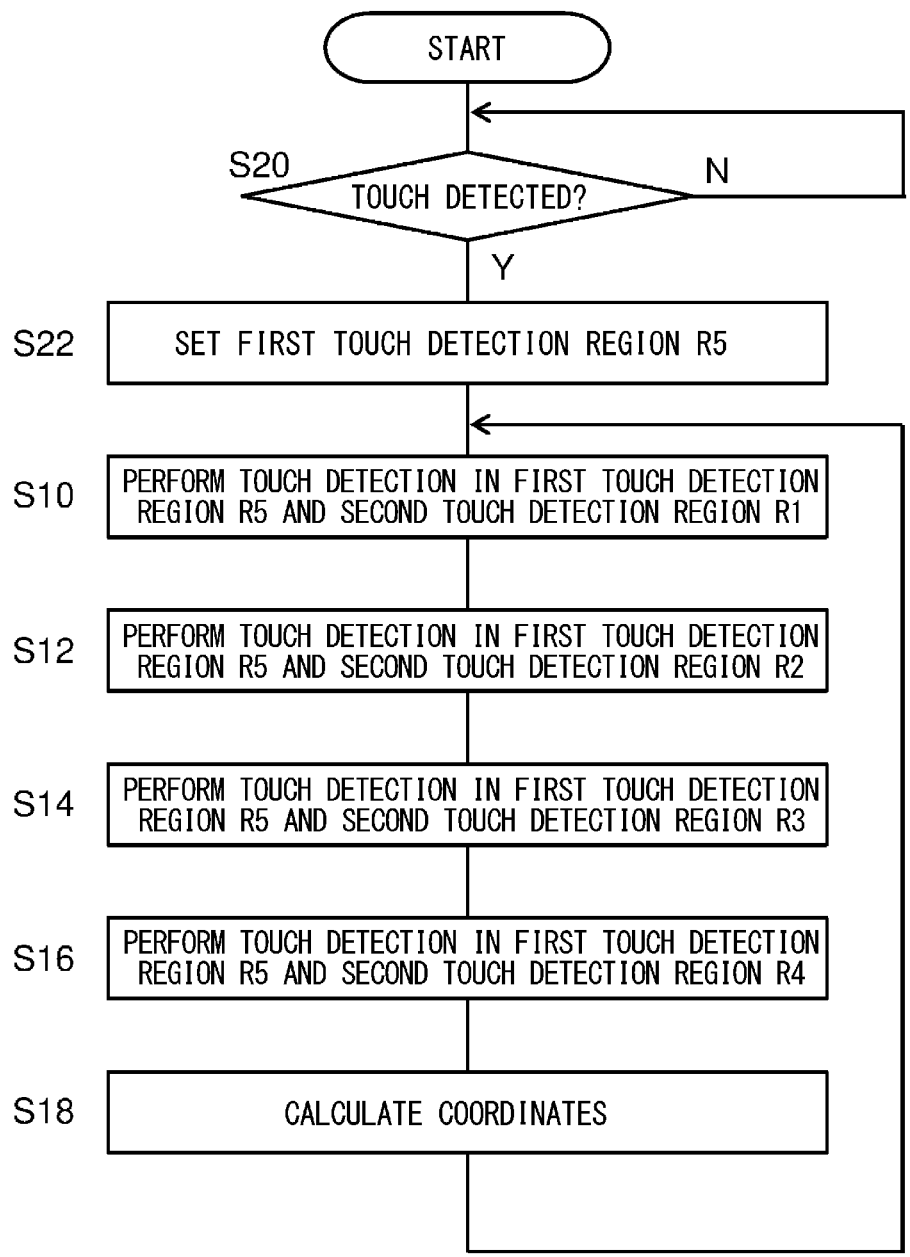
FIG. 9 is a flowchart that shows touch detection processing performed in the display system according to the second embodiment.

There will now be described the overall operation of the display system 1 having the configuration set forth above. FIG. 9 is a flowchart that shows touch detection processing performed in the display system 1 according to the second embodiment. When no touch has been detected (N at S20), the process at the control circuit 70 returns to S20. When a touch is detected (Y at S20), the control circuit 70 sets the first touch detection region R5 (S22). The subsequent processes from S10 to S18 are the same as those in the first embodiment.

The present embodiment enables faster response to a touch detection near a position where a touch has been detected.

FIG. 8A shows an example in which the number of common electrodes 34 in the second touch detection region R2 is less by the number of common electrodes 34 in the first touch detection region R5 than the number of common electrodes 34 in the second touch detection region R1. However, the number of common electrodes 34 in each of the second touch detection regions R1 through R4 may be identical or nearly identical. In this case, when the control circuit 70 has set the first touch detection region R5 that includes a common electrode 34 at the position where a touch has been detected, the control circuit 70 equally divides the common electrodes 34 other than those in the first touch detection region R5 into multiple groups, such as to re-set the multiple second touch detection regions R1 through R4. Accordingly, the maximum number of common electrodes 34 connected to the A/D converter 761 during one touch detection period can be reduced, compared to that in the second embodiment, so that the case where the number of input ports of the A/D converter 761 is smaller can also be handled. When a touch can no longer be detected in the first touch detection region R5, the control circuit 70 cancels the setting of the first touch detection region R5 and restores the multiple second touch detection regions R1 through R4 to those before the re-setting.

Also, even when a touch can no longer be detected in the first touch detection region R5, the control circuit 70 need not necessarily cancel the setting of the first touch detection region R5. In this case, when a touch can no longer be detected in the first touch detection region R5 but a new touch is detected thereafter, the control circuit 70 may cancel the existing setting of the first touch detection region R5 and re-set the first touch detection region R5 that includes a common electrode 34 at the position of the new touch thus detected. This case can simplify the control.

Third Embodiment

The third embodiment differs from the first embodiment in that a graphical user interface (GUI) is displayed in the first touch detection region R5. In the following, description will be given mainly for the differences from the first embodiment.

Figure 10A:
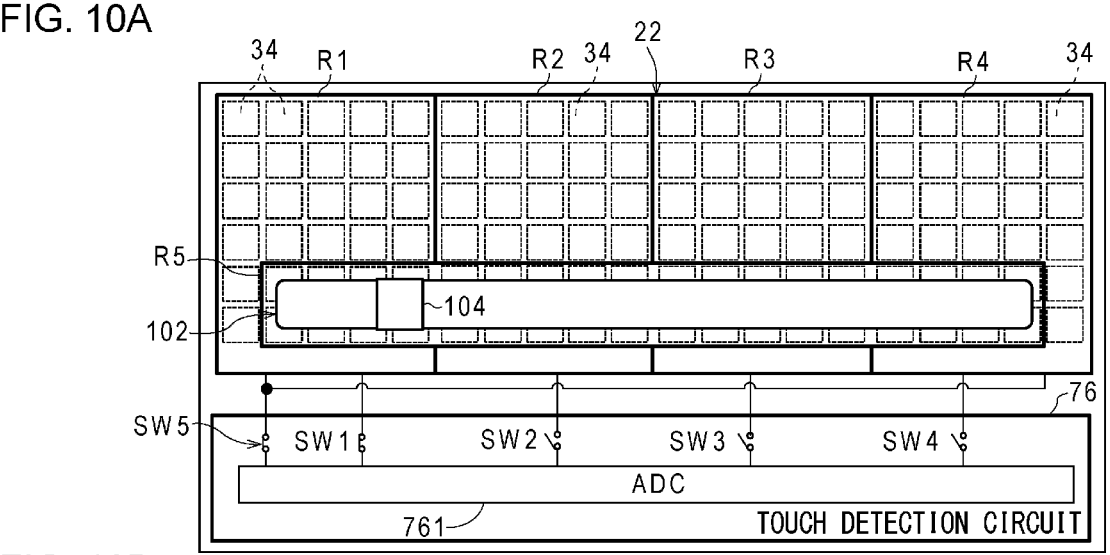
FIG. 10A is a diagram used to describe operations of a display device according to a third embodiment.
Figure 10B:
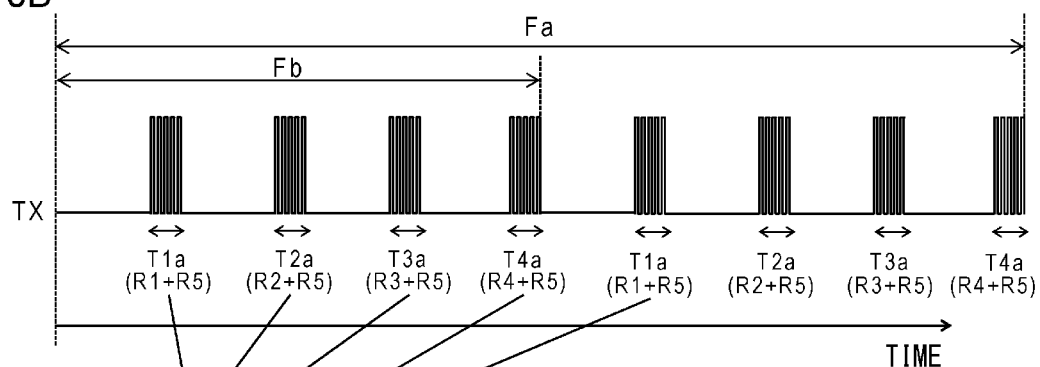
FIG. 10B shows times within a frame period of the display device shown in FIG. 10A.
Figure 10C:
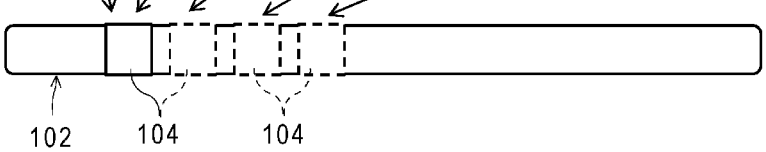
FIG. 10C shows an operation position of a handle of a slide bar at each time shown in FIG. 10B.

FIG. 10A is a diagram used to describe operations of the display device 22 according to the third embodiment, FIG. 10B shows times within a frame period Fa of the display device 22 shown in FIG. 10A, and FIG. 10C shows an operation position of a handle 104 of a slide bar 102 at each time shown in FIG. 10B.

The first touch detection region R5 is a rectangular region extending in a horizontal direction. The display device 22 displays the slide bar 102, which is a GUI, in the first touch detection region R5. The slide bar 102 includes the handle 104 that moves according to a slide operation by a user's finger. The GUI is not particularly limited, as long as it accepts a slide operation by a user's finger, and may also be a dial.

Displaying and non-displaying of the GUI on the display device 22 may be switchable. In this case, when the GUI is displayed, the control circuit 70 sets the first touch detection region R5 that includes the common electrodes 34 in the display region of the GUI. When the GUI is not displayed, the control circuit 70 cancels the setting of the first touch detection region R5, sets the second touch detection regions R1 through R4, in which the multiple common electrodes 34 within the screen are equally divided into four groups, and performs touch detection in a second touch detection region different for each touch detection period.

As is the case in the first embodiment, the touch detection in the first touch detection region R5 is performed with a shorter period, compared to the touch detection in each second touch detection region. Accordingly, when the operation position of the handle 104 moves relatively largely within a sub-frame period Fb, as shown in FIG. 10C, the operation position is detected about every 2.1 ms. Therefore, successive multiple operation positions in the slide bar 102 can be detected more certainly, compared to the control in the aforementioned first comparative example.

Figure 11:
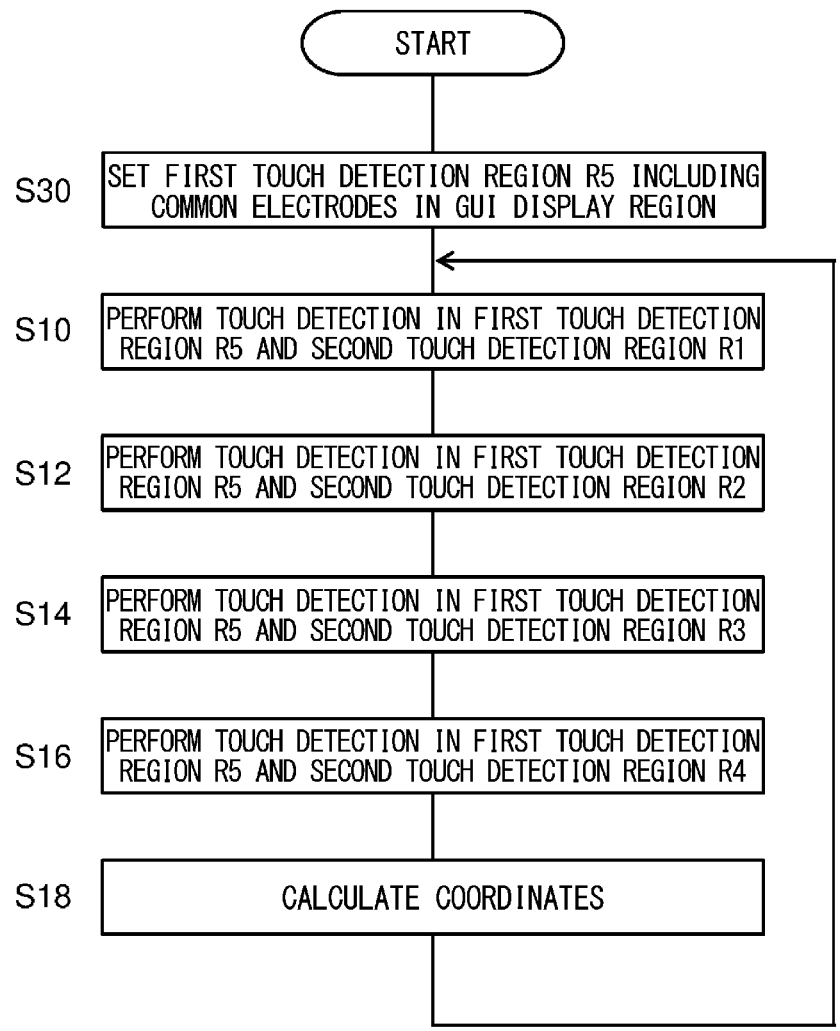
FIG. 11 is a flowchart that shows touch detection processing performed in the display system according to the third embodiment.

There will now be described the overall operation of the display system 1 having the configuration set forth above. FIG. 11 is a flowchart that shows touch detection processing performed in the display system 1 according to the third embodiment. The control circuit 70 sets the first touch detection region R5 including the common electrodes 34 in the display region of the GUI (S30). The subsequent processes from S10 to S18 are the same as those in the first embodiment.

The present embodiment enables faster response to a detection of an operation position in a GUI.

Fourth Embodiment

The fourth embodiment differs from the third embodiment in that whether or not there has been a touch in the first touch detection region R5 is judged based on the touch detection signals Rx for multiple touch detection periods. In the following, description will be given mainly for the differences from the third embodiment.

The touch detection circuit 76 performs touch detection in the first touch detection region R5 every multiple touch detection periods, based on the touch detection signals Rx received from each common electrode 34 in the first touch detection regions R5 during the multiple touch detection periods. The multiple touch detection periods may be three touch detection periods, for example, and may be appropriately determined through experiments and simulations based on the number of touch detection periods in a frame period Fa, for example.

The touch detection circuit 76 integrates the touch detection signals Rx received from each common electrode 34 in the first touch detection region R5 during the multiple touch detection periods, derives a difference between the integral value and a reference value as a detection value for each pulse timing of the touch drive signal TX, and performs touch detection based on the sum of multiple detection values. More specifically, the touch detection circuit 76 compares the sum of the detection values derived based on the touch detection signals Rx received from each common electrode 34 in the first touch detection region R5 during the multiple touch detection periods, with a predetermined touch detection threshold. When the sum of the detection values is greater than or equal to the touch detection threshold, the touch detection circuit 76 judges that there has been a touch to the position of the corresponding common electrode 34. Upon judging that there has been a touch, the touch detection circuit 76 outputs touch position information.

For example, when the sum of the detection values derived based on the touch detection signals Rx received for the touch detection periods T1a through T3a is greater than or equal to the touch detection threshold, the touch detection circuit 76 judges that there has been a touch. Thereafter, whether or not there has been a touch is similarly judged every three touch detection periods.

In the second touch detection regions, touch detection is performed in the same way as in the first embodiment. Accordingly, based on the touch detection signal received from each common electrode 34 in a second touch detection region as a detection target during each touch detection period, the touch detection circuit 76 performs touch detection in the second touch detection region as a detection target.

Compared to the touch detection in the second touch detection regions, the touch detection in the first touch detection region R5 is performed based on the touch detection signals Rx received for a longer period. Accordingly, touch detection sensitivity in the first touch detection region R5 can be made higher than the sensitivity in the second touch detection regions. Therefore, even when the GUI is touched by a glove or the like in which a capacitance variation is relatively small, a touch position can be detected with high sensitivity.

The second embodiment may be combined with the first embodiment. Also, the third embodiment may be combined with at least one of the first and second embodiments. Also, the fourth embodiment may be combined with at least one of the first and second embodiments. An additional embodiment made by such a combination has the effect of each of the combined embodiments.

Although the control device 24 is included in the display module 20 in the first through fourth embodiments, the control device 24 may be included in the host 10. Also, although the first drive circuit 72 generates the reference clock signal in the first through fourth embodiments, the second drive circuit 74 may generate the reference clock signal. Also, the number of touch detection periods included in a frame period may be more than three times the number of touch detection regions in the display device 22. These modifications allow greater flexibility in the configuration of the display system 1.

Fifth Embodiment

In the fifth embodiment, when a touch has been detected in one of multiple touch detection regions, touch detection is performed in the touch detection region where the touch has been detected, for multiple touch detection periods successively. In the following, the control of the display device 22 performed by the control circuit 70 and the operations of the display device 22 will be specifically described mainly for the differences from the first embodiment. The control circuit 70 alternately repeats partial image display on one of multiple display regions within the screen and partial touch detection on one of multiple touch detection regions within the screen, so as to control the image display and the touch detection in a time division manner.

Figure 12:
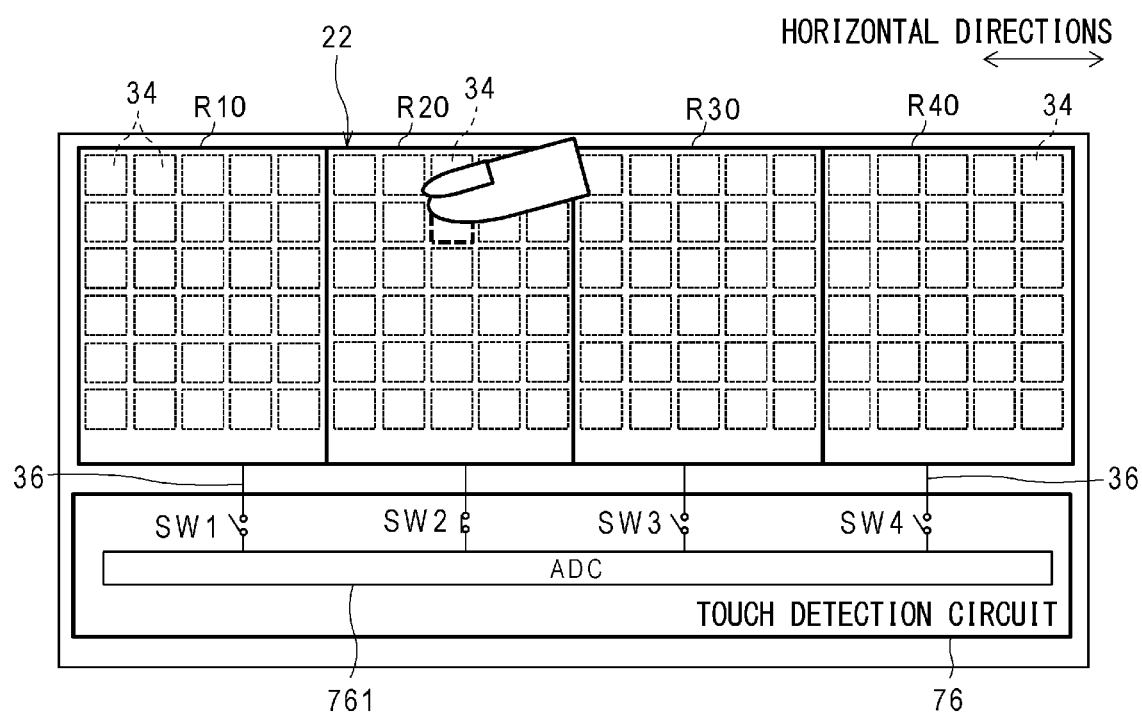
FIG. 12 is a diagram used to describe operations of a display device according to a fifth embodiment.

FIG. 12 is a diagram used to describe operations of the display device 22 according to the fifth embodiment. The display device 22 includes four touch detection regions R10, R20, R30, and R40, which are configured by dividing the multiple common electrodes 34 within the screen into multiple groups. The touch detection regions R10, R20, R30, and R40 are horizontally arranged from the left to the right in this order when viewed from the viewer. Among the multiple common electrodes 34 of the entire display device 22, multiple common electrodes 34 are arranged in each of the touch detection regions R10 through R40. The number of common electrodes 34 arranged in each touch detection region shown in FIG. 12 is set as an example. Also, the number of touch detection regions is not limited to "four".

The touch detection circuit 76 includes the A/D converter 761, and switches SW1, SW2, SW3, and SW4. Each switch includes multiple pairs of an input terminal and an output terminal, though the illustration thereof is omitted. For simplified drawing, the connections between the common electrodes 34 and the signal lines 36 are omitted in FIG. 12.

The multiple input terminals of the switch SW1 are respectively connected to the multiple common electrodes 34 included in the touch detection region R10 on a one-to-one basis, with the signal lines 36. The multiple input terminals of the switch SW2 are respectively connected to the multiple common electrodes 34 included in the touch detection region R20 on a one-to-one basis, with the signal lines 36. The multiple input terminals of the switch SW3 are respectively connected to the multiple common electrodes 34 included in the touch detection region R30 on a one-to-one basis, with the signal lines 36. The multiple input terminals of the switch SW4 are respectively connected to the multiple common electrodes 34 included in the touch detection region R40 on a one-to-one basis, with the signal lines 36.

The output terminals of the switches SW1 through SW4 are connected to input ports of the A/D converter 761. Since the number of input ports of the A/D converter 761 is less than the number of common electrodes 34 within the screen, the common electrodes 34 connected to the input ports of the A/D converter 761 are switched by means of the switches. The number of input ports of the A/D converter 761 is equal to the number of input signals that can be simultaneously processed at the A/D converter 761, and may also be referred to as the number of input channels.

The control circuit 70 performs different control operations before and after a touch is detected.

Figure 13A:
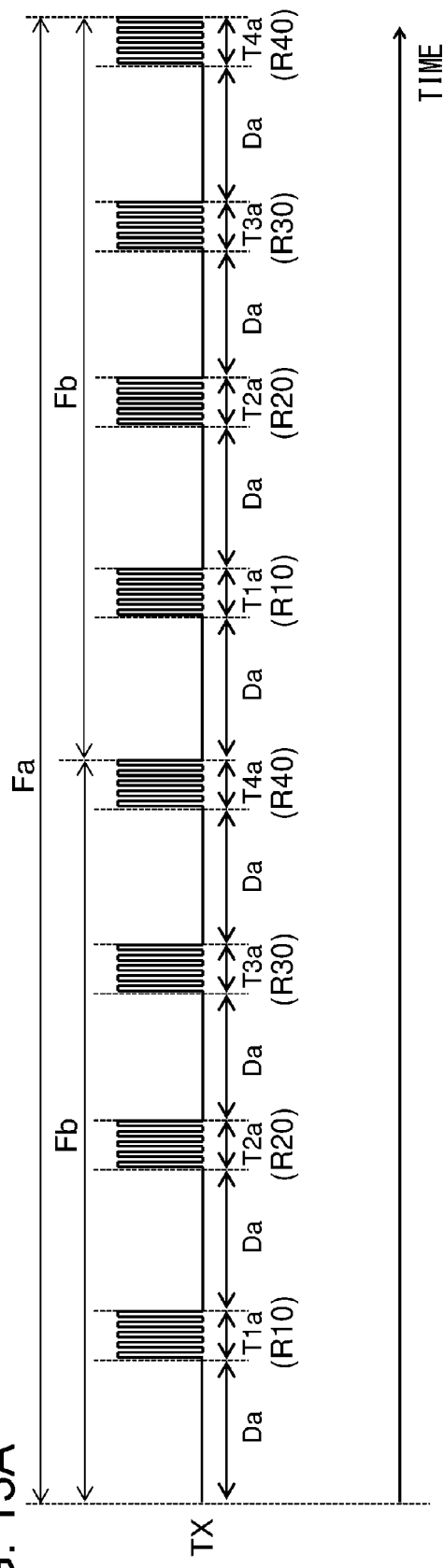
FIG. 13A shows times and waveforms of a touch drive signal within a frame period in which no touch is detected in the display device according to the fifth embodiment.

First, the operation performed when no touch has been detected will be described. FIG. 13A shows times and waveforms of the touch drive signal TX within a frame period Fa in which no touch is detected in the display device 22 according to the fifth embodiment.

In the example shown in FIG. 13A, within a frame period (one frame period) Fa, one image is displayed, and touch detection for one screen is performed twice. In the present embodiment, the display device 22 is assumed to be a display device driven at 60 Hz to display an image, so that the frame period Fa is set to about 16.7 (=1/60) ms. Since the touch detection for one screen is performed twice within a frame period Fa, the touch detection is performed with a period of about 8.3 (=1/120) ms.

A frame period Fa is divided into two sub-frame periods Fb. Each sub-frame period Fb includes four display periods Da and four touch detection periods T1a, T2a, T3a, and T4a. The display periods Da and the touch detection periods are alternately arranged. In each sub-frame period Fb, the display period Da, touch detection period T1a, display period Da, touch detection period T2a, display period Da, touch detection period T3a, display period Da, and touch detection period T4a are arranged in this order. The number of display periods Da and the number of touch detection periods in a frame period Fa are not limited to "eight".

The display device 22 displays one-eighth of a frame for each display period Da. Accordingly, one frame is displayed in the eight display periods Da within a frame period Fa. More specifically, during a display period Da, the first drive circuit 72 supplies the source signal SS to the multiple source lines and also supplies the gate signal GS to corresponding gate lines, and the second drive circuit 74 supplies the reference voltage VCOM to the multiple common electrodes 34. The second drive circuit 74 stops supply of the touch drive signal TX during the display periods Da.

During each touch detection period, the second drive circuit 74 supplies the touch drive signal TX to the multiple common electrodes 34 in the touch detection regions R10 through R40. The second drive circuit 74 stops supply of the reference voltage VCOM during the touch detection periods.

When no touch has been detected, the control circuit 70 makes a different one of the switches SW1 through SW4 conductive for each touch detection period. The touch detection signals Rx input to the switch thus made conductive are output to the A/D converter 761. The A/D converter 761 converts the analog touch detection signals Rx input via the switch, into digital touch detection signals.

During the touch detection period T1a, the touch detection circuit 76 performs detection of a touch by an object on the touch detection region R10, based on the touch detection signals Rx received from the multiple common electrodes 34 in the touch detection region R10. During the touch detection period T2a, the touch detection circuit 76 performs detection of a touch by an object on the touch detection region R20, based on the touch detection signals Rx received from the multiple common electrodes 34 in the touch detection region R20.

During the touch detection period T3a, the touch detection circuit 76 performs detection of a touch by an object on the touch detection region R30, based on the touch detection signals Rx received from the multiple common electrodes 34 in the touch detection region R30. During the touch detection period T4a, the touch detection circuit 76 performs detection of a touch by an object on the touch detection region R40, based on the touch detection signals Rx received from the multiple common electrodes 34 in the touch detection region R40.

Thus, when no touch has been detected, during each of the multiple touch detection periods, the touch detection circuit 76 performs touch detection in a touch detection region different for each touch detection period. In other words, the touch detection circuit 76 serially changes the touch detection region as a detection target. During the eight touch detection periods in a frame period Fa, touch detection for one screen is performed twice. The display device 22 may include touch detection regions equal in number to the touch detection periods in a frame period Fa, and, in this case, the touch detection for one screen is performed once during the multiple touch detection periods in a frame period Fa.

Figure 13B:
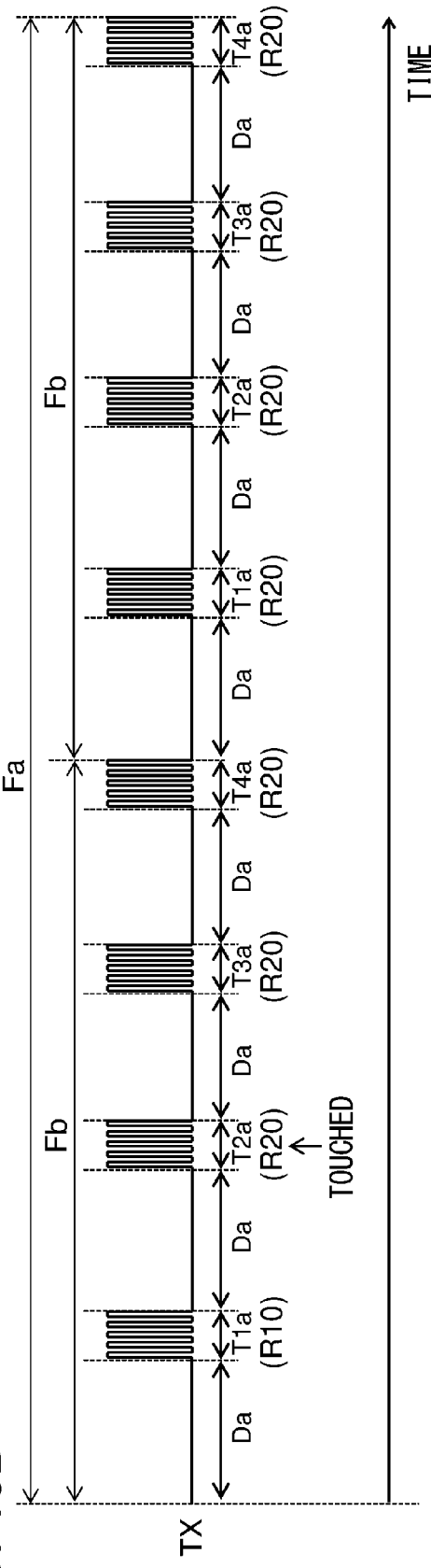
FIG. 13B shows times and waveforms of a touch drive signal within a frame period in which a touch is detected in the display device according to the fifth embodiment.

Next, the operation performed when a touch has been detected in one of the multiple touch detection regions R10 through R 40 will be described. FIG. 13B shows times and waveforms of the touch drive signal TX within a frame period Fa in which a touch is detected in the display device 22 according to the fifth embodiment.

When a touch has been detected, the control circuit 70 continuously makes one of the switches SW1 through SW4 conductive, which was conductive at the time of the detection of the touch. When a touch has been detected, the touch detection circuit 76 performs touch detection in the touch detection region where the touch has been detected, for multiple touch detection periods successively.

When the touch detection circuit 76 successively performs touch detection in the touch detection region where the touch has been detected, the touch detection circuit 76 performs touch detection during each of the multiple touch detection periods and outputs the touch position information each time a touch is detected. Accordingly, the touch position information is output in each touch detection period.

In the example shown in FIGS. 12 and 13B, a touch is detected in the touch detection region R20 during the touch detection period T2a. Accordingly, the touch detection circuit 76 successively performs touch detection in the touch detection region R20 during the touch detection periods T3a, T4a, T1a, T2a, T3a, and T4a subsequent to the touch detection period T2a.

While the touch detection circuit 76 successively performs touch detection in the touch detection region where a touch has been detected, when a touch can no longer be detected, the operation returns to that performed when no touch has been detected. Accordingly, the touch detection circuit 76 performs touch detection in a touch detection region different for each touch detection period. Therefore, when a touch is no longer detected, touch detection on the entire screen can be performed again.

A second comparative example will now be described. The second comparative example differs from the present embodiment in that, irrespective of whether or not a touch has been detected, touch detection is performed in a touch detection region different for each touch detection period, as shown in FIG. 13A. Touch detection in a touch detection region is performed every 8.3 ms as a sub-frame period Fb. Accordingly, if a touch is detected in the touch detection region R20 during the touch detection period T2a and the touched object is then slid or moved away from the screen within 8.3 ms thereafter, for example, such movements will not be detected immediately, and the position to which the object has been slid or the discontinuance of the touch will be detected in the next touch detection period T2a.

In contrast with the second comparative example, in the present embodiment, touch detection is successively performed in a touch detection region where a touch has been detected, as described previously. Therefore, response to a touch detection can be made faster than that in the second comparative example. In the example shown in FIG. 13B, the touch detection in the touch detection regions R20 where the touch has been detected is performed with a period of about 2.1 ms. Therefore, the occasion where the touched object is slid or moved away from the screen can be detected at earlier timing, compared to the second comparative example.

Figure 14:
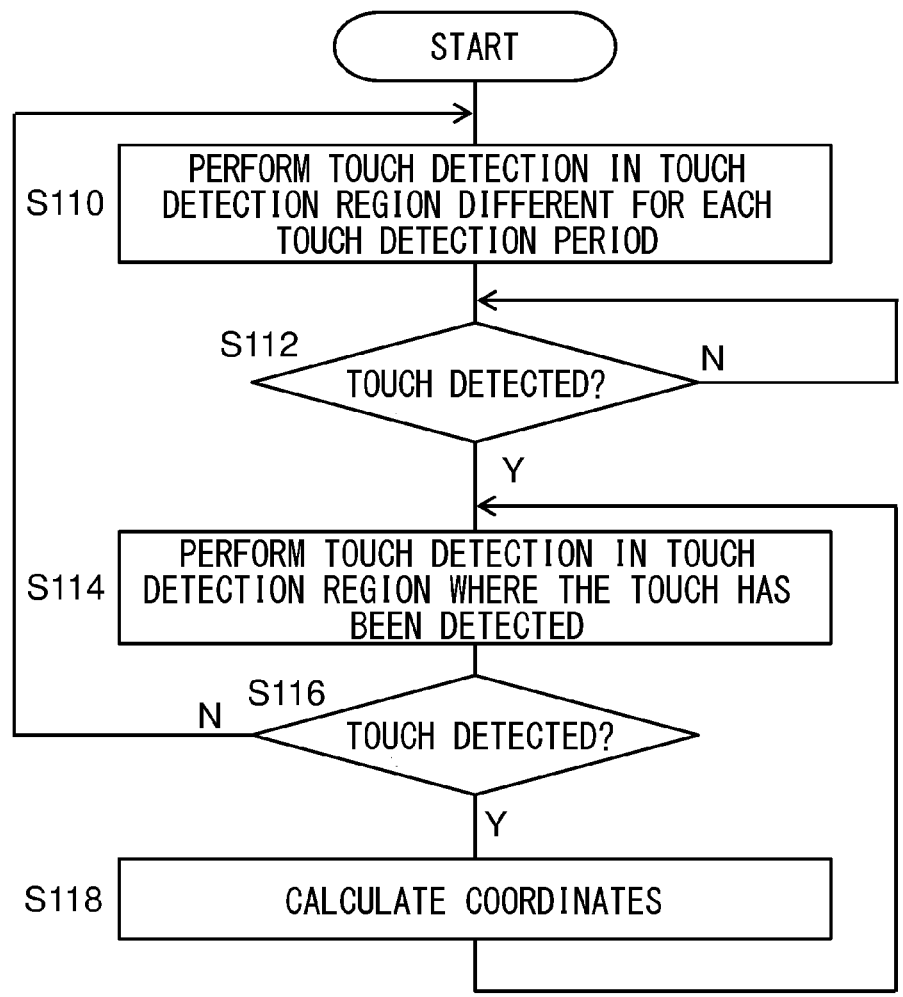
FIG. 14 is a flowchart that shows touch detection processing performed in the display system according to the fifth embodiment.

There will now be described the overall operation of the display system 1 having the configuration set forth above. FIG. 14 is a flowchart that shows touch detection processing performed in the display system 1 according to the fifth embodiment. The touch detection circuit 76 performs touch detection in a touch detection region different for each touch detection period (S110) and, when no touch has been detected (N at S112), the process returns to S112. When a touch has been detected (Y at S112), the touch detection circuit 76 further performs touch detection in the touch detection region where the touch has been detected (S114). Thereafter, when a touch is further detected (Y at S116), the control circuit 70 calculates the coordinates (S118) and the process returns to S114. When no touch has been detected at S116 (N at S116), the process returns to S110.

According to the present embodiment, touch detection is performed in a touch detection region where a touch has been detected, for multiple touch detection periods successively, so that faster response to a touch detection is enabled. Also, the frequency of outputting the touch position information can be increased.

Another Example of Detection in Fifth Embodiment

In the second comparative example, there may be a case where a touch is incorrectly detected because of noise or the like even though there is no touch by an object. In order to handle the case, a third comparative example is also known, in which touch position information is output only when touches are successively detected at the same position during multiple touch detection periods. In this case, since touch position information is not output when a touch is detected only once because of noise or the like, incorrect detection can be restrained. However, when touch position information is output after two touches are successively detected, for example, the time required to output the touch position information is twice the time in the second comparative example, causing slower response.

Accordingly, in the fifth embodiment, when the touch detection circuit 76 performs touch detection in a touch detection region where a touch has been detected during each of multiple touch detection periods, the touch detection circuit 76 may output the touch position information when touches are detected a predetermined number of times successively. The predetermined number of times is multiple times and may be appropriately determined through experiments and simulations based on the number of touch detection periods in a frame period Fa, for example. Accordingly, response can be made faster than that in the third comparative example, while incorrect detection is restrained.

Sixth Embodiment

The sixth embodiment differs from the fifth embodiment in that touch detection is performed based on the sum of detection values for multiple touch detection periods in a touch detection region where a touch has been detected. In the following, description will be given mainly for the differences from the fifth embodiment.

As is the case in the fifth embodiment, when no touch has been detected, the touch detection circuit 76 compares the sum of the detection values derived based on the touch detection signal Rx received from each common electrode 34 with a first touch detection threshold. When the sum of the detection values is greater than or equal to the first touch detection threshold, the touch detection circuit 76 judges that there has been a touch to the position of the corresponding common electrode 34. The first touch detection threshold is set smaller than the sum of the detection values obtained in the case where the screen is touched by a glove or the like in which a capacitance variation is smaller than that in a finger or the like, so that, even in such a case, it is correctly judged that there has been a touch. Since it may be incorrectly judged that there has been a touch because of noise, the touch detection circuit 76 does not output the touch position information at that point. This can restrain output of an incorrect touch position due to noise.

When the touch detection circuit 76 successively performs touch detection in a touch detection region where a touch has been detected, the touch detection circuit 76 performs touch detection every multiple touch detection periods, based on the touch detection signals Rx received during the multiple touch detection periods. The multiple touch detection periods may be three touch detection periods, for example, and may be appropriately determined through experiments and simulations based on the number of touch detection periods in a frame period Fa, for example.

In this case, the touch detection circuit 76 integrates the touch detection signals Rx received from each common electrode 34 during the multiple touch detection periods, derives a difference between the integral value and a reference value as a detection value for each pulse timing of the touch drive signal TX, and performs touch detection based on the sum of multiple detection values. More specifically, the touch detection circuit 76 compares the sum of the detection values derived based on the touch detection signals Rx received from each common electrode 34 during the multiple touch detection periods, with a predetermined second touch detection threshold. When the sum of the detection values is greater than or equal to the second touch detection threshold, the touch detection circuit 76 judges that there has been a touch to the position of the corresponding common electrode 34. Upon judging that there has been a touch, the touch detection circuit 76 outputs the touch position information. The second touch detection threshold is larger than the first touch detection threshold.

In the example shown in FIG. 13B, when a touch is detected in the touch detection period T2a and when the sum of the detection values derived based on the touch detection signals Rx received for the three touch detection periods T2a through T4a is greater than or equal to the second touch detection threshold, the touch detection circuit 76 judges that there has been a touch. Thereafter, whether or not there has been a touch is similarly judged every three touch detection periods until a touch is no longer detected.

Figure 15:
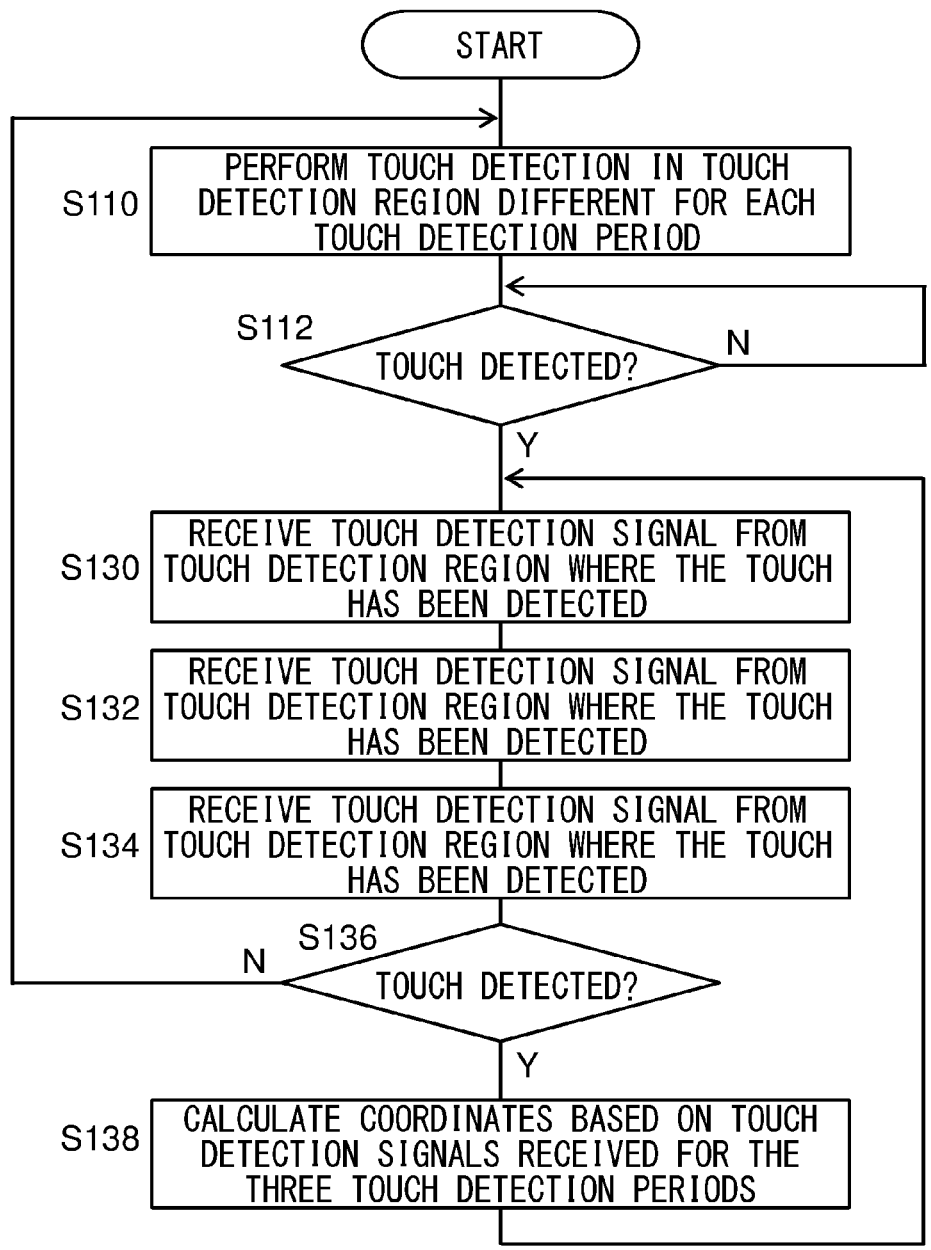
FIG. 15 is a flowchart that shows touch detection processing performed in a display system according to a sixth embodiment.

FIG. 15 is a flowchart that shows touch detection processing performed in the display system 1 according to the sixth embodiment. The processes from S110 to S112 are the same as those in the fifth embodiment. When a touch has been detected at S112 (Y at S112), the touch detection circuit 76 receives, during a touch detection period, the touch detection signal Rx from the touch detection region where the touch has been detected (S130), also receives, during the subsequent touch detection period, the touch detection signal Rx from the touch detection region where the touch has been detected (S132), and further receives, during the further subsequent touch detection period, the touch detection signal Rx from the touch detection region where the touch has been detected (S134). When a touch is detected based on the touch detection signals Rx (Y at S136), the control circuit 70 calculates the coordinates based on the touch detection signals Rx received for the three touch detection periods (S138) and the process returns to S130. When no touch has been detected at S136 (N at S136), the process returns to S110.

As is the case in the fifth embodiment, also in the aforementioned second comparative example, whether or not there has been a touch is judged based on the sum of detection values of which the number is identical with the number of pulses in the touch drive signal TX within one touch detection period. Accordingly, increasing the number of pulses in the touch drive signal TX within one touch detection period can make the value of the sum of the detection values greater, thereby improving the touch sensitivity. However, since the length of one touch detection period is limited, increasing the number of pulses in the touch drive signal TX is difficult in the second comparative example.

In contrast with the second comparative example, in the present embodiment, the value of the sum of the detection values can be made greater without increasing the number of pulses in the touch drive signal TX within one touch detection period. Therefore, the touch detection sensitivity can be improved and, in addition, faster response to a touch detection is enabled. In the display device 22 to be mounted on a vehicle, a resin cover, instead of glass, is increasingly used for a protection layer disposed on the front side of the display device 22, for the reasons of safety and increased demand for curved surface displays. Since a resin cover has a dielectric constant lower than that of glass, the touch sensitivity may be lowered. However, in the present embodiment, the sensitivity can be improved even with a resin cover.

Also, in the second comparative example, when the amplitude of the touch drive signal TX is made smaller, radiation caused by the touch drive signal TX can be reduced, but the sensitivity is lowered. In contrast with the second comparative example, in the present embodiment, the amplitude of the touch drive signal TX can be made smaller while the detection sensitivity is maintained. Accordingly, the radiation can be reduced while the lowering of the sensitivity can be restrained.

Seventh Embodiment

The seventh embodiment differs from the fifth embodiment in that, when touch detection is successively performed in a touch detection region where a touch has been detected, the touch detection method is switched based on the sum of detection values at the time of the detection of the touch. In the following, description will be given mainly for the differences from the fifth embodiment.

As is the case in the fifth embodiment, when no touch has been detected, the touch detection circuit 76 compares the sum of the detection values derived based on the touch detection signal Rx received from each common electrode 34 with the first touch detection threshold. When the sum of the detection values is greater than or equal to the first touch detection threshold, the touch detection circuit 76 judges that there has been a touch to the position of the corresponding common electrode 34.

When a touch has been detected and when the sum of the detection values of a common electrode 34 on which the touch has been detected is greater than or equal to a judgment threshold, the touch detection circuit 76 performs touch detection during each of multiple touch detection periods and outputs the touch position information each time a touch is detected. In other words, the touch detection circuit 76 performs the touch detection processing of the fifth embodiment. The sum of the detection values of a common electrode 34 on which a touch has been detected corresponds to a value related to a difference value between the capacitance of the common electrode 34 on which the touch has been detected and a reference capacitance.

When the sum of the detection values is smaller than the judgment threshold, the touch detection circuit 76 performs touch detection every multiple touch detection periods, based on the touch detection signals Rx received during the multiple touch detection periods. In other words, the touch detection circuit 76 performs the touch detection processing of the sixth embodiment. As described previously, the touch detection circuit 76 compares the sum of the detection values derived based on the touch detection signals Rx received from each common electrode 34 during the multiple touch detection periods, with the second touch detection threshold. When the sum of the detection values is greater than or equal to the second touch detection threshold, the touch detection circuit 76 judges that there has been a touch to the position of the corresponding common electrode 34.

The judgment threshold is set smaller than the sum of the detection values obtained when the screen is touched by a finger or the like in which a capacitance variation is relatively large. The judgment threshold is larger than the first touch detection threshold.

Figure 16:
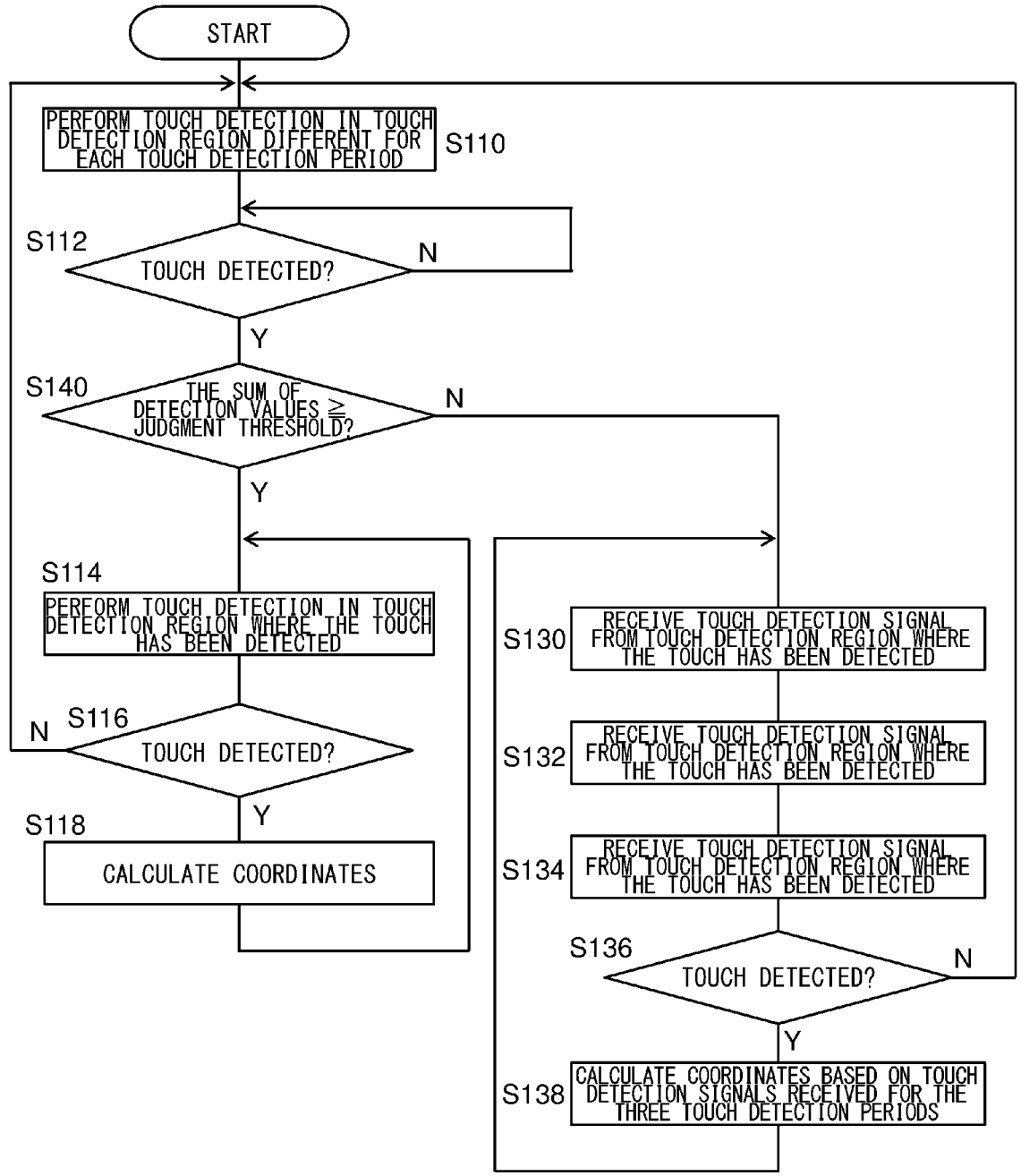
FIG. 16 is a flowchart that shows touch detection processing performed in a display system according to a seventh embodiment.

FIG. 16 is a flowchart that shows touch detection processing performed in the display system 1 according to the seventh embodiment. When a touch has been detected at S112 (Y at S112) and when the sum of detection values of a common electrode 34 on which the touch has been detected is greater than or equal to the judgment threshold (Y at S140), the process shifts to S114. The processes from S114 to S118 are the same as those in the fifth embodiment. When the sum of the detection values of the common electrode 34 on which the touch has been detected is less than the judgment threshold (N at S140), the process shifts to S130. The processes from S130 to S138 are the same as those in the sixth embodiment.

According to the present embodiment, when the screen is touched by a finger or the like in which a capacitance variation is relatively large, touch detection is performed during each of multiple touch detection periods, so that faster response to a touch detection is enabled. Meanwhile, when the screen is touched by a glove or the like in which a capacitance variation is relatively small, touch detection is performed every multiple touch detection periods, so that detection sensitivity can be improved. Accordingly, touch detection appropriate for the touched object can be performed.

The present disclosure has been described with reference to embodiments. The embodiments are intended to be illustrative only, and it will be obvious to those skilled in the art that various modifications to a combination of constituting elements or processes in the embodiments could be developed and that such modifications also fall within the scope of the present disclosure.

For example, in the seventh embodiment, when the sum of the detection values of the common electrode 34 on which a touch has been detected is smaller than the judgment threshold, the processing in the another example of detection in the fifth embodiment may be performed. This allows greater flexibility in the configuration of the display system 1.

Although the control device 24 is included in the display module 20 in the fifth through seventh embodiments, the control device 24 may be included in the host 10. Also, although the first drive circuit 72 generates the reference clock signal in the fifth through seventh embodiments, the second drive circuit 74 may generate the reference clock signal. Also, the number of touch detection periods included in a frame period may be more than three times the number of touch detection regions in the display device 22. These modifications allow greater flexibility in the configuration of the display system 1.

Figure 17:
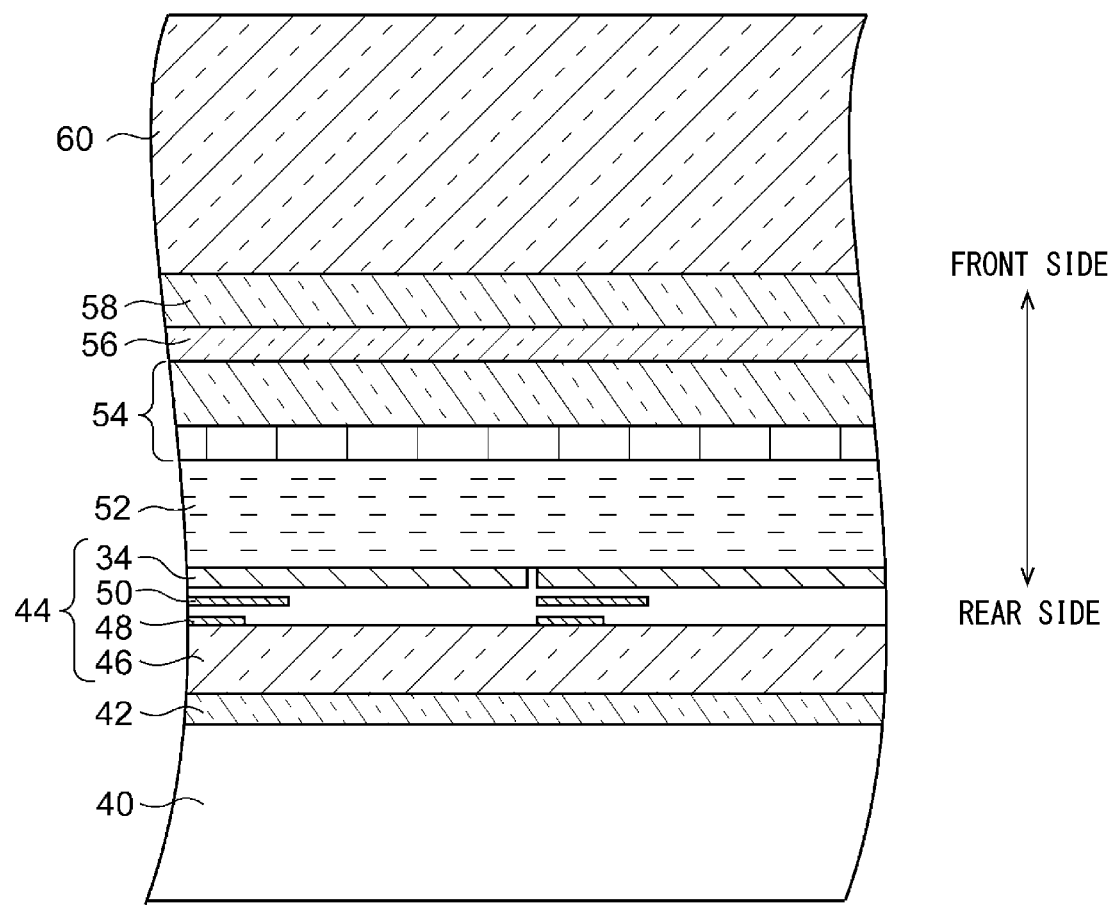
FIG. 17 is a longitudinal sectional view of the display device shown in FIG. 1.

The display device 22 may have a configuration as described below, for example. FIG. 17 is a longitudinal sectional view of the display device 22 shown in FIG. 1. The display device 22 includes a backlight unit 40, a lower polarizer 42, a thin-film transistor substrate (hereinafter, referred to as a TFT substrate) 44, a liquid crystal layer 52, a color filter substrate 54, an upper polarizer 56, a bonding layer 58, and a protection layer 60, which are laminated and disposed in this order along a depth direction.

In the following, with regard to the depth directions of the display device 22, the side on which the protection layer 60 is positioned with respect to the TFT substrate 44 is defined as the front side, and the opposite side is defined as the rear side.

Using the light emitted from the backlight unit 40, the display device 22 emits image light toward the front side, or the viewer side.

The TFT substrate 44 includes a glass substrate 46 and also includes multiple gate electrodes 48, multiple source electrodes 50, and multiple common electrodes 34, which are arranged on the front side of the glass substrate 46. The TFT substrate 44 also includes the multiple gate lines G1, G2, and so on, the multiple source lines S1, S2, and so on, the multiple pixel electrodes 32, and the multiple pixel switching elements 30 shown in FIG. 2, though the illustration thereof is omitted. The liquid crystal layer 52 disposed on the front side of the TFT substrate 44 is controlled by means of lateral electric fields that occur between pixel electrodes 32 and common electrodes 34.

The bonding layer 58 has translucency and bonds the upper polarizer 56 and the protection layer 60. The bonding layer 58 may be formed by curing transparent resin in a liquid state, such as optically clear resin (OCR), or curing a transparent adhesive sheet, such as optically clear adhesive (OCA), for example.

The protection layer 60 is a layer that has translucency and protects the display device 22, and the protection layer 60 is constituted by a glass substrate or a plastic substrate, for example. The protection layer 60 is also called a cover lens, for example.

A display system according to one aspect of the present disclosure is as follows.

The display system includes:

a display device including multiple common electrodes used for both image display and touch detection;

a drive circuit that supplies a touch drive signal to each of the multiple common electrodes; and a touch detection circuit that performs detection of a touch by an object on the display device, based on a touch detection signal received from each of the multiple common electrodes, within a frame period of the display device, a display period for which the display device displays an image and a touch detection period for which the touch detection circuit performs touch detection are alternately arranged, the display device includes a first touch detection region and multiple second touch detection regions, configured by dividing the multiple common electrodes into multiple groups, and, during multiple touch detection periods, the touch detection circuit performs touch detection in the same first touch detection region and in a second touch detection region different for each touch detection period.

According to the aspect, response to a touch detection in the first touch detection region can be made faster than that in the second touch detection regions.

The display system according to the one aspect of the present disclosure may, for example, further include a control circuit that sets, when a touch is detected, the first touch detection region that includes a common electrode at the position of the touch thus detected.

This case enables faster response to a touch detection at a position where a touch has been detected.

In the display system according to the one aspect of the present disclosure, for example, when the control circuit has set the first touch detection region that includes a common electrode at the position where a touch has been detected and when a touch is no longer detected in the first touch detection region, the control circuit may cancel the setting of the first touch detection region and perform touch detection in a second touch detection region different for each touch detection period.

In this case, when a touch can no longer be detected, the number of touch detection signals processed at the touch detection circuit during one touch detection period can be reduced thereafter.

In the display system according to the one aspect of the present disclosure, for example, when the control circuit has set the first touch detection region that includes a common electrode at the position where a touch has been detected, the control circuit may divide common electrodes other than the common electrodes in the first touch detection region into multiple groups, such as to re-set the multiple second touch detection regions.

In this case, the number of the common electrodes in each second touch detection region can be made more equal.

The display system according to the one aspect of the present disclosure may, for example, further include a dial that is rotatable and disposed in the first touch detection region on a display surface of the display device, and the touch detection circuit may detect a rotating position of the dial as a touch position.

This case enables faster response to a detection of a rotating position of the dial.

In the display system according to the one aspect of the present disclosure, for example, the display device may display a graphical user interface (GUI) in the first touch detection region.

This case enables faster response to a detection of an operation position in a GUI.

In the display system according to the one aspect of the present disclosure, for example, the touch detection circuit may perform touch detection in the first touch detection region every multiple touch detection periods, based on the touch detection signals received from common electrodes in the first touch detection region during the multiple touch detection periods.

In this case, touch detection sensitivity in the first touch detection region can be made higher than the sensitivity in the second touch detection regions.

A control device according to one aspect of the present disclosure is a control device configured to control a display device including multiple common electrodes used for both image display and touch detection, the control device includes:

a drive circuit that supplies a touch drive signal to each of the multiple common electrodes; and a touch detection circuit that performs detection of a touch by an object on the display device, based on a touch detection signal received from each of the multiple common electrodes, within a frame period of the display device, a display period for which the display device displays an image and a touch detection period for which the touch detection circuit performs touch detection are alternately arranged, the display device includes a first touch detection region and multiple second touch detection regions, configured by dividing the multiple common electrodes into multiple groups, and, during multiple touch detection periods, the touch detection circuit performs touch detection in the same first touch detection region and in a second touch detection region different for each touch detection period.

According to the aspect, response to a touch detection in the first touch detection region can be made faster than that in the second touch detection regions.

A control method according to one aspect of the present disclosure is a control method for a display device including multiple common electrodes used for both image display and touch detection, the control method includes:

supplying a touch drive signal to each of the multiple common electrodes; and performing detection of a touch by an object on the display device, based on a touch detection signal received from each of the multiple common electrodes, within a frame period of the display device, a display period for which the display device displays an image and a touch detection period for which touch detection is performed are alternately arranged, the display device includes a first touch detection region and multiple second touch detection regions, configured by dividing the multiple common electrodes into multiple groups, and, in the performing detection of a touch, during multiple touch detection periods, touch detection is performed in the same first touch detection region and in a second touch detection region different for each touch detection period.

According to the aspect, response to a touch detection in the first touch detection region can be made faster than that in the second touch detection regions.

A display system according to one aspect of the present disclosure is as follows.

The display system includes:

a display device including multiple common electrodes used for both image display and touch detection;

a drive circuit that supplies a touch drive signal to each of the multiple common electrodes; and a touch detection circuit that performs detection of a touch by an object on the display device, based on a touch detection signal received from each of the multiple common electrodes, within a frame period of the display device, a display period for which the display device displays an image and a touch detection period for which the touch detection circuit performs touch detection are alternately arranged, the display device includes multiple touch detection regions, configured by dividing the multiple common electrodes into multiple groups, and, when no touch has been detected, the touch detection circuit performs touch detection in a touch detection region different for each touch detection period, and, when a touch has been detected in one of the multiple touch detection regions, the touch detection circuit performs touch detection in the touch detection region where the touch has been detected, for multiple touch detection periods successively.

According to the aspect, faster response to a touch detection is enabled.

In the display system according to the one aspect of the present disclosure, for example, when the touch detection circuit successively performs touch detection in a touch detection region where a touch has been detected, the touch detection circuit may perform touch detection during each of multiple touch detection periods.

This case enables faster response to a touch detection.

In the display system according to the one aspect of the present disclosure, for example, the touch detection circuit may output touch position information each time a touch is detected.

In this case, the frequency of outputting the touch position information can be increased.

In the display system according to the one aspect of the present disclosure, for example, the touch detection circuit may output touch position information when touches are detected multiple times successively.

In this case, incorrect detection can be restrained.

In the display system according to the one aspect of the present disclosure, for example, when the touch detection circuit successively performs touch detection in a touch detection region where a touch has been detected, the touch detection circuit may perform touch detection every multiple touch detection periods, based on touch detection signals received during the multiple touch detection periods.

In this case, since touch detection is performed based on the touch detection signals received for a longer period, detection sensitivity can be improved. Also, the amplitude of the touch drive signal can be made smaller while the detection sensitivity is maintained. Therefore, the radiation can be reduced.

In the display system according to the one aspect of the present disclosure, for example, when the touch detection circuit successively performs touch detection in a touch detection region where a touch has been detected, the touch detection circuit may derive multiple detection values that each represent a difference value between a capacitance of a common electrode and a reference capacitance based on touch detection signals received during multiple touch detection periods, and the touch detection circuit may perform touch detection based on the sum of the multiple detection values.

In this case, detection sensitivity can be improved.

In the display system according to the one aspect of the present disclosure, for example, when a touch has been detected in one of the multiple touch detection regions, (1) when a value related to a difference value between a capacitance of a common electrode on which the touch has been detected and a reference capacitance is greater than or equal to a judgment threshold, the touch detection circuit may perform touch detection during each of multiple touch detection periods, and (2) when the value related to the difference value is smaller than the judgment threshold, the touch detection circuit may perform touch detection every multiple touch detection periods, based on touch detection signals received during the multiple touch detection periods.

In this case, touch detection appropriate for the touched object can be performed.

In the display system according to the one aspect of the present disclosure, for example, while the touch detection circuit successively performs touch detection in a touch detection region where a touch has been detected, when a touch is no longer detected, the touch detection circuit may perform touch detection in a touch detection region different for each touch detection period.

In this case, when a touch is no longer detected, touch detection on the entire screen can be performed.

A control device according to one aspect of the present disclosure is a control device configured to control a display device including multiple common electrodes used for both image display and touch detection, the control device includes:

a drive circuit that supplies a touch drive signal to each of the multiple common electrodes; and a touch detection circuit that performs detection of a touch by an object on the display device, based on a touch detection signal received from each of the multiple common electrodes, within a frame period of the display device, a display period for which the display device displays an image and a touch detection period for which the touch detection circuit performs touch detection are alternately arranged, the display device includes multiple touch detection regions, configured by dividing the multiple common electrodes into multiple groups, and, when no touch has been detected, the touch detection circuit performs touch detection in a touch detection region different for each touch detection period, and, when a touch has been detected in one of the multiple touch detection regions, the touch detection circuit performs touch detection in the touch detection region where the touch has been detected, for multiple touch detection periods successively.

According to the aspect, faster response to a touch detection is enabled.

A control method according to one aspect of the present disclosure is a control method for a display device including multiple common electrodes used for both image display and touch detection, the control method includes:

supplying a touch drive signal to each of the multiple common electrodes; and performing detection of a touch by an object on the display device, based on a touch detection signal received from each of the multiple common electrodes, within a frame period of the display device, a display period for which the display device displays an image and a touch detection period for which touch detection is performed are alternately arranged, the display device includes multiple touch detection regions, configured by dividing the multiple common electrodes into multiple groups, and, in the performing detection of a touch, when no touch has been detected, touch detection is performed in a touch detection region different for each touch detection period, and, when a touch has been detected in one of the multiple touch detection regions, touch detection is performed in the touch detection region where the touch has been detected, for multiple touch detection periods successively.

According to the aspect, faster response to a touch detection is enabled.

A display device according to one aspect of the present disclosure is a display device provided in the display system according to one aspect of the present disclosure, and the display device includes multiple common electrodes used for both image display and touch detection.

According to the aspect, a display device used in a display system can be provided.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2019-060317, filed on Mar. 27, 2019, Japanese Patent Application No. 2019-060318, filed on Mar. 27, 2019 and Japanese Patent Application No. 2020-002920, filed on Jan. 10, 2020, the entire contents of which are incorporated herein by reference.

What is claimed is:

1. A display system, comprising:
a display device comprising a plurality of common electrodes used for both image display and touch detection;
a drive circuit that supplies a touch drive signal to each of the plurality of common electrodes; and
a touch detection circuit that performs detection of a touch by an object on the display device, based on a touch detection signal received from each of the plurality of common electrodes,
wherein, within a frame period of the display device, a plurality of display periods for which the display device displays an image and a plurality of touch detection periods for which the touch detection circuit performs touch detection are alternately arranged,
the display device includes a first touch detection region and a plurality of second touch detection regions, configured by dividing the plurality of common electrodes into a plurality of groups,
the plurality of second touch detection regions includes a third touch detection region and a fourth touch detection region, the fourth touch detection region being different from the third touch detection region,
the plurality of touch detection periods includes a first touch detection period and a second touch detection period,
the touch detection circuit performs touch detection in the first touch detection region and in the third touch detection region and does not perform touch detection in the fourth touch detection region during the first touch detection period, and
the touch detection circuit performs touch detection in the first touch detection region and in the fourth touch detection region and does not perform touch detection in the third touch detection region during the second touch detection period.

2. The display system according to claim 1, further comprising a control circuit that sets, when the touch is detected, the first touch detection region that includes a common electrode at the position of the touch thus detected.

3. The display system according to claim 2, wherein, when the control circuit has set the first touch detection region that includes the common electrode at the position where the touch has been detected and when the touch is no longer detected in the first touch detection region, the control circuit cancels the setting of the first touch detection region and performs touch detection in one of the plurality of second touch detection regions for each of the plurality of touch detection periods.

4. The display system according to claim 2, wherein, when the control circuit has set the first touch detection region that includes the common electrode at the position where the touch has been detected, the control circuit divides common electrodes other than common electrodes in the first touch detection region into a plurality of groups, such as to re-set the plurality of second touch detection regions.

5. The display system according to claim 1, further comprising a dial that is rotatable and disposed in the first touch detection region on a display surface of the display device,
wherein the touch detection circuit detects a rotating position of the dial as a touch position.

6. The display system according to claim 1, wherein the display device displays a graphical user interface (GUI) in the first touch detection region.

7. The display system according to claim 1, wherein the touch detection circuit performs touch detection in the first touch detection region during each of the plurality of touch detection periods, based on the touch detection signals received from common electrodes in the first touch detection region during the plurality of touch detection periods.

8. A display system, comprising:
a display device comprising a plurality of common electrodes used for both image display and touch detection;
a drive circuit that supplies a touch drive signal to each of the plurality of common electrodes; and
a touch detection circuit that performs detection of a touch by an object on the display device, based on a touch detection signal received from each of the plurality of common electrodes,
wherein, within a frame period of the display device, a plurality of display periods for which the display device displays an image and a plurality of touch detection periods for which the touch detection circuit performs touch detection are alternately arranged,
the display device includes a plurality of touch detection regions, configured by dividing the plurality of common electrodes into a plurality of groups,
the plurality of touch detection periods includes a first touch detection period and a second touch detection period, the first touch detection period and the second touch detection period being successive among the plurality of touch detection periods,
the plurality of touch detection regions include a first touch detection region and a second touch detection region, the second touch detection region being different from the first touch detection region,
the touch detection circuit performs touch detection in the first touch detection region during the first touch detection period,
the touch detection circuit performs touch detection in the first touch detection region and not in the second touch detection region during the second touch detection period in response to a touch being detected in the first touch detection region during the first touch detection period, and
the touch detection circuit performs touch detection in the second touch detection region and not in the first touch detection region during the second touch detection period in response to the touch not being detected in the first touch detection region during the first touch detection period.

9. The display system according to claim 8, wherein the touch detection circuit outputs touch position information each time the touch is detected.

10. The display system according to claim 8, wherein the touch detection circuit outputs touch position information when touches are detected a plurality of times successively.

11. The display system according to claim 8, wherein, when the touch detection circuit successively performs touch detection in a touch detection region where the touch has been detected, the touch detection circuit performs touch detection during each of the plurality of touch detection periods, based on touch detection signals received during the plurality of touch detection periods.

12. The display system according to claim 11, wherein, when the touch detection circuit successively performs touch detection in the touch detection region where the touch has been detected, the touch detection circuit derives a plurality of detection values that each represent a difference value between a capacitance of a common electrode and a reference capacitance based on the touch detection signals received during the plurality of touch detection periods, and the touch detection circuit performs touch detection based on a sum of the plurality of detection values.

13. The display system according to claim 8, wherein, when the touch has been detected in one of the plurality of touch detection regions, (1) when a value related to a difference value between a capacitance of a common electrode on which the touch has been detected and a reference capacitance is greater than or equal to a judgment threshold, the touch detection circuit performs touch detection during each of the plurality of touch detection periods, and (2) when the value related to the difference value is smaller than the judgment threshold, the touch detection circuit performs touch detection every multiple touch detection periods, based on touch detection signals received during the plurality of touch detection periods.

14. The display system according to claim 8, wherein, while the touch detection circuit successively performs touch detection in the first touch detection region in response to the touch being detected, when the touch is no longer detected, the touch detection circuit performs touch detection in a different one of the plurality of touch detection regions for each remaining touch detection period.

\* \* \* \* \*